US009298405B2

(12) United States Patent
Kamishiro

(10) Patent No.: US 9,298,405 B2
(45) Date of Patent: Mar. 29, 2016

(54) ELECTRONIC APPARATUS, MANAGEMENT SYSTEM, AND RECORDING MEDIUM

(71) Applicant: Daisuke Kamishiro, Kanagawa (JP)

(72) Inventor: Daisuke Kamishiro, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 217 days.

(21) Appl. No.: 13/652,662

(22) Filed: Oct. 16, 2012

(65) Prior Publication Data

US 2013/0100479 A1    Apr. 25, 2013

(30) Foreign Application Priority Data

Oct. 20, 2011   (JP) ................................. 2011-230960

(51) Int. Cl.
*G06K 15/00*   (2006.01)
*G06F 3/12*   (2006.01)
*G06F 21/60*   (2013.01)

(52) U.S. Cl.
CPC ............ *G06F 3/1238* (2013.01); *G06F 3/1222* (2013.01); *G06F 3/1267* (2013.01); *G06F 3/1285* (2013.01); *G06F 21/608* (2013.01)

(58) Field of Classification Search
None
See application file for complete search history.

(56) References Cited

U.S. PATENT DOCUMENTS

| 7,263,724 | B2 * | 8/2007 | Okigami ......................... 726/32 |
| 2005/0275868 | A1 * | 12/2005 | Higashiura et al. .......... 358/1.14 |
| 2006/0001897 | A1 * | 1/2006 | Ogasawara .................. 358/1.13 |
| 2006/0065715 | A1 * | 3/2006 | Kojima et al. ................ 235/380 |
| 2007/0206214 | A1 | 9/2007 | Kano et al. |
| 2008/0021933 | A1 | 1/2008 | Ono |
| 2008/0151286 | A1 * | 6/2008 | Matsuo ........................ 358/1.15 |
| 2008/0151293 | A1 * | 6/2008 | Narukawa .................... 358/1.15 |
| 2008/0192294 | A1 * | 8/2008 | Reddy et al. ................. 358/1.15 |
| 2008/0288507 | A1 | 11/2008 | Nakagawa |
| 2009/0103933 | A1 * | 4/2009 | Miyazaki et al. ............... 399/12 |
| 2009/0310158 | A1 * | 12/2009 | Ishikawa et al. .............. 358/1.9 |
| 2011/0067026 | A1 | 3/2011 | Nishio |
| 2011/0317215 | A1 * | 12/2011 | Ida et al. ..................... 358/1.15 |

FOREIGN PATENT DOCUMENTS

| JP | 2000-035869 | 2/2000 |
| JP | 2008-148088 | 6/2008 |

(Continued)

OTHER PUBLICATIONS

Extended European Search Report dated Mar. 20, 2013.
Japanese Office Action dated Sep. 29, 2015.

*Primary Examiner* — Vincent Rudolph
*Assistant Examiner* — John Wallace
(74) *Attorney, Agent, or Firm* — Ipusa, PLLC

(57) ABSTRACT

An electronic apparatus includes an information presenting part that obtains the job information of a stored first job of a first user who has logged on to the electronic apparatus and the job information of a stored second job of a second user who has authorized the first user to execute the second job from a computer connected to the electronic apparatus, and presents the obtained job information to the first user; and an execution control part that, when one of the first and the second job is selected and instructed to be executed by the first user, obtains the job data of the one of the first and the second job from the computer and execute the obtained job data. The first user and the stored first job are correlated and managed and the first user and the second user are correlated and managed in a predetermined storage area.

19 Claims, 20 Drawing Sheets

(56) References Cited

FOREIGN PATENT DOCUMENTS

| JP | 2010-152726 | 7/2010 |
|---|---|---|
| JP | 2011-059631 | 3/2011 |

\* cited by examiner

FIG.5

| USER IDENTIFICATION | AUTHENTICATION | RIGHT OF USAGE | USAGE HISTORY | USAGE UPPER LIMIT |
|---|---|---|---|---|
| UserA | **** | (COLOR PRINTING, MONOCHROME PRINTING) | 95 | 100 |
| UserB | **** | (MONOCHROME PRINTING) | 50 | 100 |
| UserC | **** | (MONOCHROME PRINTING) | 50 | 100 |
| ... | ... | ... | ... | ... |

| JOB IDENTIFICATION | STORING USER IDENTIFICATION | BIBLIOGRAPHY | STORAGE DESTINATION | ... |
|---|---|---|---|---|
| J001 | UserA | (FILENAME:"MINUTES.doc", ..., COPY NUMBER SETTING:5, COLOR SETTING:COLOR, ....) | D:¥Storage¥UserA¥Job_1.prn | ... |
| J002 | UserB | (FILENAME:"Memo.txt", COPY NUMBER SETTING:1, ..., COLOR SETTING:MONOCHROME, ....) | D:¥Storage¥UserB¥Job_2.prn | ... |
| J003 | UserB | (FILENAME:"PRESENTATION.ppt", ..., COPY NUMBER SETTING:3, COLOR SETTING:COLOR, ....) | D:¥Storage¥UserB¥Job_3.prn | ... |
| J004 | UserC | (FILENAME:"MATERIAL.ppt", ..., COPY NUMBER SETTING:1, COLOR SETTING:MONOCHROME, ....) | D:¥Storage¥UserC¥Job_4.prn | ... |
| ... | ... | ... | ... | ... |

| LOGON USER IDENTIFICATION | EXECUTION AUTHORIZING USER IDENTIFICATION | USAGE HISTORY RECORDING TARGET USER IDENTIFICATION |
|---|---|---|
| UserA | UserB | UserB |
| UserB | UserA | UserA |
| UserC | UserA | UserA |
| | UserB | UserC |
| ... | ... | ... |

FIG.11

| USAGE HISTORY RECORDING TARGET USER IDENTIFICATION | USAGE VALUE | EXECUTION CONDITION VALUE |
|---|---|---|
| UserA | 5 | (COLOR, ····) |
| UserB | 1 | (MONOCHROME, ····) |
| UserB | 3 | (COLOR, ····) |

UPD

FIG.14A

| JOB LIST | | |
|---|---|---|
| UserA | J001 | (FILENAME:"MINUTES.doc",..., COPY NUMBER SETTING:5, COLOR SETTING:COLOR, ...) UserA |
| UserB | J002 | (FILENAME:"Memo.txt",..., COPY NUMBER SETTING:1, COLOR SETTING:MONOCHROME, ...) UserB |
| | J003 | (FILENAME:"PRESENTATION.ppt", ..., COPY NUMBER SETTING:3, COLOR SETTING:COLOR, ...) UserB |

| JOB LIST | | | |
|---|---|---|---|
| UserA | J001 | (FILENAME:"MINUTES.doc", ..., COPY NUMBER SETTING:5, COLOR SETTING:COLOR, ...) | UserA |
| UserB | J002 | (FILENAME:"Memo.txt", ..., COPY NUMBER SETTING:1, COLOR SETTING:MONOCHROME, ...) | UserB |
| UserB | J003 | (FILENAME:"PRESENTATION.ppt", ..., COPY NUMBER SETTING:3, COLOR SETTING:COLOR, ...) | UserB |

| JOB LIST | | | W3 |
|---|---|---|---|
| | J001 | (FILENAME:"MINUTES.doc", ..., COPY NUMBER SETTING:5, COLOR SETTING:COLOR, ...) | UserA |
| UserA | | | |
| | J002 | (FILENAME:"Memo.txt", ..., COPY NUMBER SETTING:1, COLOR SETTING:MONOCHROME, ...) | UserB |
| UserB | J003 | (FILENAME:"PRESENTATION.ppt", ..., COPY NUMBER SETTING:3, COLOR SETTING:COLOR, ...) | UserB |

FIG.16B

| JOB LIST | | | |
|---|---|---|---|
| UserA | J001 | (FILENAME:"MINUTES.doc", ..., COPY NUMBER SETTING:5, COLOR SETTING:COLOR, ...) | UserA |
| UserB | J002 | (FILENAME:"Memo.txt", ..., COPY NUMBER SETTING:1, COLOR SETTING:MONOCHROME, ...) | UserB |
| | J003 | (FILENAME:"PRESENTATION.ppt", ..., COPY NUMBER SETTING:3, COLOR SETTING:COLOR, ...) | UserB |

W4

ELECTRONIC APPARATUS, MANAGEMENT SYSTEM, AND RECORDING MEDIUM

CROSS-REFERENCE TO RELATED APPLICATION

The present application is based upon and claims the benefit of priority of the prior Japanese Patent Application No. 2011-230960, filed on Oct. 20, 2011, the entire contents of which are incorporated herein by reference.

BACKGROUND OF THE INVENTION

1. Field of the Invention

The present invention relates to a technique for managing execution of a job by an electronic apparatus.

2. Description of the Related Art

For example, Japanese Laid-Open Patent Application No. 2000-035869 discloses a technique where an image processor displays the job list of a user who has logged on and executes a job selected from the job list. Further, Japanese Laid-Open Patent Application No. 2011-059631 discloses the technique of recording a history of usage of an image processor on a user basis and restricting execution of a job based on the recorded history of usage.

Thus, the technique of managing execution of a job by an electronic apparatus such as an image processor is effective in terms of TCO (Total Cost of Ownership) reduction and confidentiality maintenance (information security).

SUMMARY OF THE INVENTION

According to an aspect of the present invention, an electronic apparatus includes an information presenting part configured to obtain first job information of a stored first job of a first user who has logged on to the electronic apparatus and second job information of a stored second job of a second user who has authorized the first user to execute the second job from a computer connected to the electronic apparatus via a predetermined data transmission channel, and present the obtained first and second job information to the first user, wherein the first user who has stored the first job and the stored first job are correlated and managed in a predetermined storage area and the first user and the second user are correlated and managed in the predetermined storage area; and an execution control part configured to, in response to one of the first job and the second job being selected and instructed to be executed based on the presented first and second job information by the first user, obtain job data of the one of the first job and the second job from the computer and execute the obtained job data.

According to an aspect of the present invention, a management system includes a program that causes a computer to implement a job management part configured to manage a first user who has stored a first job and the stored first job in correlation with each other in a predetermined storage area; and an execution authorization management part configured to manage the first user and a second user in correlation with each other in the predetermined storage area, wherein the second user has authorized the first user to execute a second job of the second user; and an electronic apparatus connected to the computer via a predetermined data transmission channel, the electronic apparatus including an information presenting part configured to obtain first job information of the stored first job of the first user who has logged on to the electronic apparatus and second job information of the stored second job of the second user from the computer, and present the obtained first and second job information to the first user; and an execution control part configured to, in response to one of the first job and the second job being selected and instructed to be executed based on the presented first and second job information by the first user, obtain job data of the one of the first job and the second job from the computer and execute the obtained job data.

According to an aspect of the present invention, a computer-readable recording medium with a program recorded thereon, the program being executed by a processor in an electronic apparatus connected via a predetermined data transmission channel to a computer where a first user who has stored a first job and the stored first job are correlated and managed in a predetermined storage area and the first user and a second user who has authorized the first user to execute a second job of the second user are correlated and managed in the predetermined storage area, wherein the program is executed by the processor to cause the electronic apparatus to implement: an information presenting part configured to obtain first job information of the stored first job of the first user who has logged on to the electronic apparatus and second job information of the stored second job of the second user from the computer, and present the obtained first and second job information to the first user; and an execution control part configured to, in response to one of the first job and the second job being selected and instructed to be executed based on the presented first and second job information by the first user, obtain job data of the one of the first job and the second job from the computer and execute the obtained job data.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 5 is a diagram illustrating example data of user information according to the embodiment of the present invention;

FIG. 6 is a diagram illustrating example data of job information according to the embodiment of the present invention;

FIG. 7 is a diagram illustrating example data of execution authorization information according to the embodiment of the present invention;

FIG. 11 is a diagram illustrating example data of update information UPD according to the embodiment of the present invention;

FIGS. 14A and 14B are diagrams illustrating display examples of a job list screen according to the variation of the embodiment of the present invention;

FIGS. 16A and 16B are diagrams illustrating display examples of the job list screen according to the variation of the embodiment of the present invention;

DETAILED DESCRIPTION OF THE PREFERRED EMBODIMENTS

The conventional methods, however, have the following problem, for example. Conventionally, when a user logs on to an electronic apparatus and gives an instruction to obtain a job list, the job list of the user who has logged on is displayed. That is, a job list covering only the stored jobs of the user who has logged on (the jobs owned by the user who has logged on) is displayed.

However, in the case of using an electronic apparatus, the following situation may be considered. For example, a user A may be requested by a user B to execute a stored job of the user B. In this case, as described above, the electronic apparatus displays only the job list of the user A who has logged on, so that the user A is prevented from selecting and executing the job requested by the user B. Further, the same is the case when one user possesses multiple logon accounts, for example. In this case, the electronic apparatus displays a job list that covers only jobs tied to an account to which the user has logged on. Therefore, the user is prevented from selecting and executing a stored job of the user that is tied to another account of the user.

Thus, in the management of job execution, it is desired that a highly convenient job execution management service be provided in view of the above-described usage situations of the electronic apparatus.

According to an aspect of the present invention, an electronic apparatus and a management system are provided that are capable of implementing a highly convenient job execution management service.

According to an aspect of the present invention, a computer-readable recording medium is provided in which a management program capable of implementing a highly convenient job execution management service is recorded.

A description is given, with reference to the accompanying drawings, of embodiments of the present invention.

[System Configuration]

Figure 1:
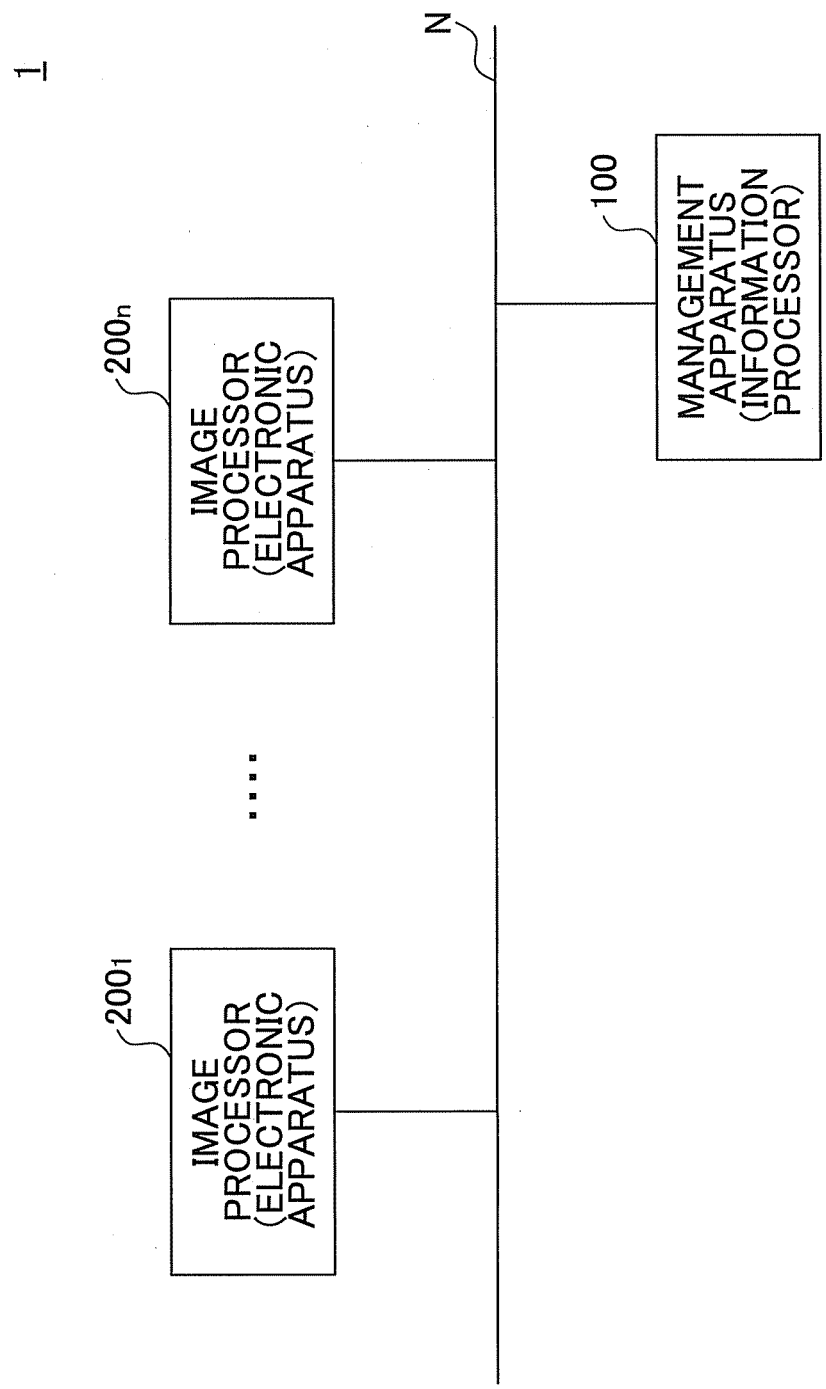
FIG. 1 is a diagram illustrating a configuration of a management system according to an embodiment of the present invention.

FIG. 1 is a diagram illustrating configuration of a management system 1 according to an embodiment of the present invention.

FIG. 1 illustrates a system configuration where one or more image processors $200_1$ through $200n$ (which may be hereinafter collectively referred to as an "image processor 200") and a management apparatus 100 are connected to a predetermined data transmission channel N such as a local area network (LAN).

The image processor 200 is an electronic apparatus with an image processing function including printing. Examples of the image processor 200 include a printer and a multifunction peripheral (MFP). The management apparatus 100 is an information processor with the management function of managing jobs stored (accumulated) in a predetermined storage area and managing usage of the image processor 200 due to execution of the stored jobs. Examples of the management apparatus 100 include a management server.

In response to an obtaining request from the image processor 200, the management apparatus 100 returns a job list of a user to the image processor 200. As a result, the image processor 200 displays the obtained job list, and receives the user's selection of a job to be executed and the user's instruction to execute the job. Thereafter, in response to an obtaining request from the image processor 200, the management apparatus 100 returns job data corresponding to the job selected and instructed to be executed to the image processor 200. As a result, the image processor 200 executes the obtained job data, and notifies the management apparatus 100 of usage of the image processor 200 by the execution of the job. In response, the management apparatus 100 updates the history (records) of usage of the image processor 200 based on the received notice.

Thus, according to the management system 1 of this embodiment, it is possible to provide a job execution management service that manages execution of a job by the image processor 200.

[Hardware Configuration]
[Management Apparatus]

Figure 2:
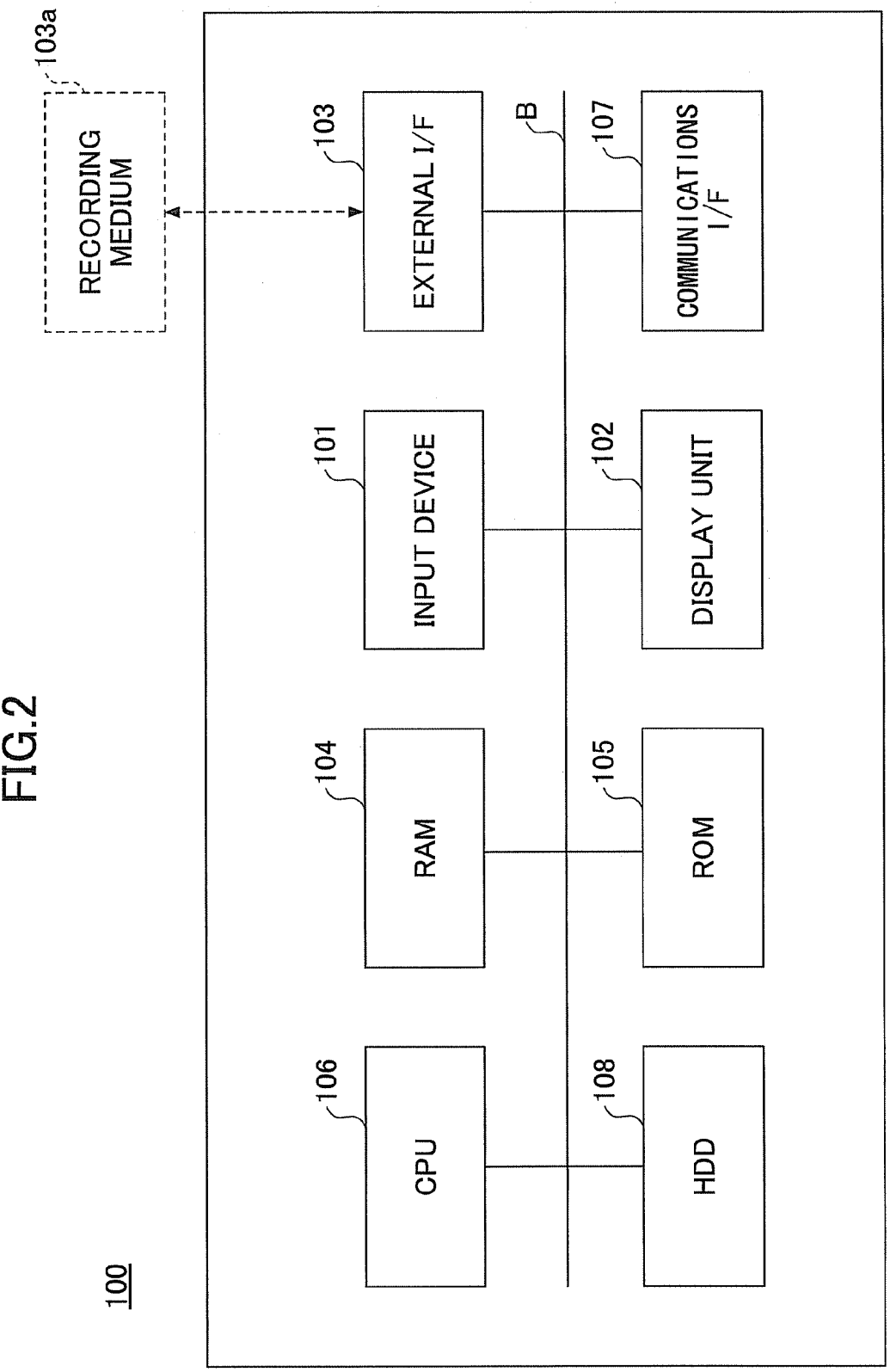
FIG. 2 is a block diagram illustrating a hardware configuration of a management apparatus according to the embodiment of the present invention.

FIG. 2 is a block diagram illustrating a hardware configuration of the management apparatus 100 according to this embodiment.

Referring to FIG. 2, the management apparatus 100 includes an input device 101, a display unit 102, an external interface (I/F) 103, a random access memory (RAM) 104, a read-only memory (ROM) 105, a central processing unit (CPU) 106, a communications interface (I/F) 107, and a hard disk drive (HDD) 108, which are interconnected by a bus B.

The input device 101, which includes a keyboard and a mouse, is used to input operation signals to the management apparatus 100. The display unit 102, which includes a display, displays the results of processing by the management apparatus 100.

The communications I/F 107 is an interface for connecting the management apparatus 100 to a network. Thus, the management apparatus 100 is allowed to perform data communications with other devices or apparatuses (for example, the image processor 200) via the communications I/F 107.

The HDD 108 is a non-volatile storage that contains programs and data. The contained programs and data include an operating system (OS), which is basic software that controls the whole apparatus, and application software that provides functions on the OS. The HDD 108 manages the contained programs and data with a predetermined file system and/or database (DB).

The external I/F 103 is an interface with an external device or apparatus. Examples of external devices or apparatuses include a recording medium 103a. Thus, the management apparatus 100 is allowed to read and/or write to the recording medium 103a via the external I/F 103. Examples of the recording medium 103a include a floppy (trademark or registered trademark) disk, a compact disk (CD), a digital versatile disk (DVD), an SD memory card, and a universal serial bus (USB) memory.

The ROM 105 is a non-volatile semiconductor memory (storage) that retains internal data even when the management apparatus 100 is turned off. The ROM 105 contains programs and data such as a basic input/output system (BIOS) that is executed when the management apparatus 100 is activated, OS settings, and network settings. The RAM 104 is a volatile semiconductor memory (storage) that temporarily retains programs and data. The CPU 106 is a processor that reads programs and data from the storage (such as the HDD 108 or the ROM 105) into the RAM 104 and executes processes, thereby controlling the whole management apparatus 100 and implementing functions provided in the management apparatus 100. For example, a program recorded on the recording medium 103a may be read via the external device I/F 103 and stored in the HDD 108. Then, the program may be loaded from the HDD 108 into the RAM 104 to be executed by the CPU 106.

Thus, it is possible for the management apparatus 100 according to this embodiment to provide information processing services including management of job execution through the above-described hardware configuration.

[Image Processor]

Figure 3:
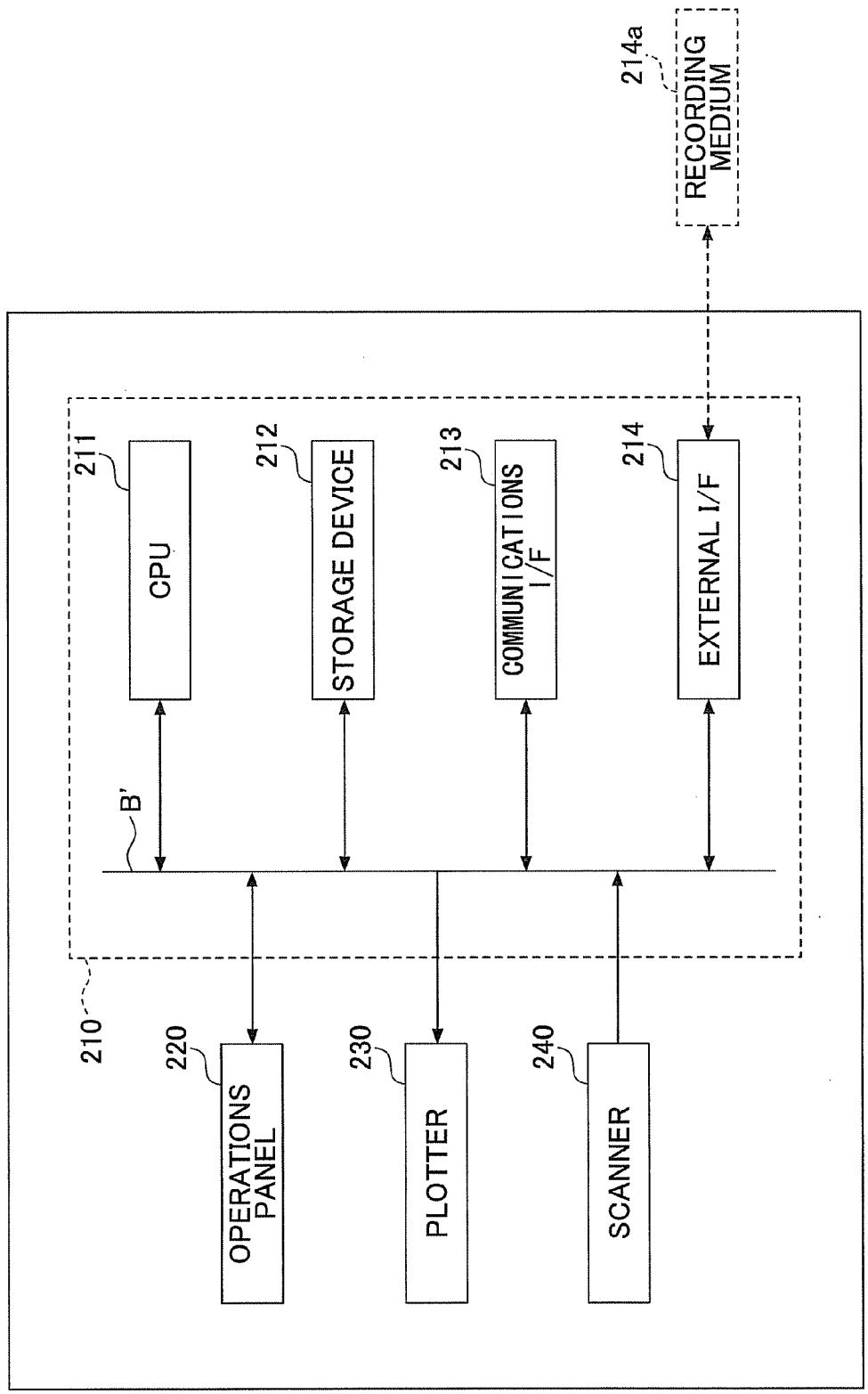
FIG. 3 is a block diagram illustrating a hardware configuration of an image processor according to the embodiment of the present invention.

FIG. 3 is a block diagram illustrating a hardware configuration of the image processor 200 according to this embodiment.

Referring to FIG. 3, the image processor 200 includes a controller 210, an operations panel 220, a plotter 230, and a scanner 240, which are interconnected by a bus B'.

The operations panel 220, which includes a display part and an input part, provides various kinds of information such as apparatus information to users and receives users' operations such as operation settings and operation instructions. The plotter 230, which includes an image forming part, forms an output image on a recording medium such as paper. Examples of systems for forming an output image include an electrophotographic process and an inkjet system. The scanner 240 optically reads an original material such as a document and generates a read image.

The controller 210 includes a central processing unit (CPU) 211, a storage device 212, a communications interface (I/F) 213, and an external interface (I/F) 214, which are interconnected by the bus B'.

The CPU 211, the communications I/F 213, and the external I/F 214 are the same as the CPU 106, the communications I/F 107, and the external I/F 103 of the management apparatus 100. Further, the storage device 212 stores and retains programs and data (such as image data). The storage device 212 includes a RAM, a ROM, and an HDD, which may be the same as the RAM 104, the ROM 105, and the HDD 108 of the management apparatus 100. For example, a program recorded on a recording medium 214a may be read via the external device I/F 214 and stored in the HDD of the storage device 212. Then, the program may be read from the HDD into the RAM to be executed by the CPU 211.

Thus, it is possible for the image processor 200 according to this embodiment to provide image processing services including printing through the above-described hardware configuration.

[Job Execution Management Function]

A description is given of a job execution management function according to this embodiment.

According to the management system 1 of this embodiment, the management apparatus 100 manages the correspondence between a first user and a second user who authorizes the first user to execute a job. The image processor 200 requests the management apparatus 100 to obtain a job list of a user who has logged on (a logon user). As a result, the management apparatus 100 returns a job list that covers the stored job(s) of the logon user and the stored job(s) of a user correlated with the logon user to the image processor 200. Thereafter, in response to receiving the logon user's selection of a job to be executed and the logon user's instruction to execute the job, the image processor 200 requests the management apparatus 100 to obtain the data of the job to be executed. As a result, the management apparatus 100 return stored job data corresponding to the job to be executed to the image processor 200. Thereafter, the image processor 200 executes the job data, and notifies the management apparatus 100 of a user (target user) for whom a history of usage (usage history) due to execution of a job is to be recorded and requests the management apparatus 100 to update the usage history. As a result, the management apparatus 100 updates the usage history of the target user. The management system 1 according to this embodiment includes such a job execution management function.

According to the conventional job execution management method, a user who logs on to the image processor 200 is prevented from executing a stored job of another user which the logon user is authorized to execute. Further, a user who possesses multiple logon accounts is prevented from executing a stored job tied to a first account that is different from a second account through which the user has logged on to the image processor 200.

Therefore, according to the management system 1 of this embodiment, the management apparatus 100 manages the correspondence between a first user and a second user who has authorized the first user to execute a job of the second user, and returns, to the requesting image processor 200 (requestor), a job list that covers the stored job(s) of a logon user and the stored job(s) of a user with whom the logon user is correlated.

As a result, the management system 1 according to this embodiment provides an environment in which it is possible to select any stored job that a logon user is authorized to execute as a job to be executed and to give an instruction to execute the stored job. Consequently, according to the management system 1 of this embodiment, it is possible to implement a highly convenient job execution management service.

A description is given below of a configuration and an operation of a job execution management function according to this embodiment.

Figure 4:
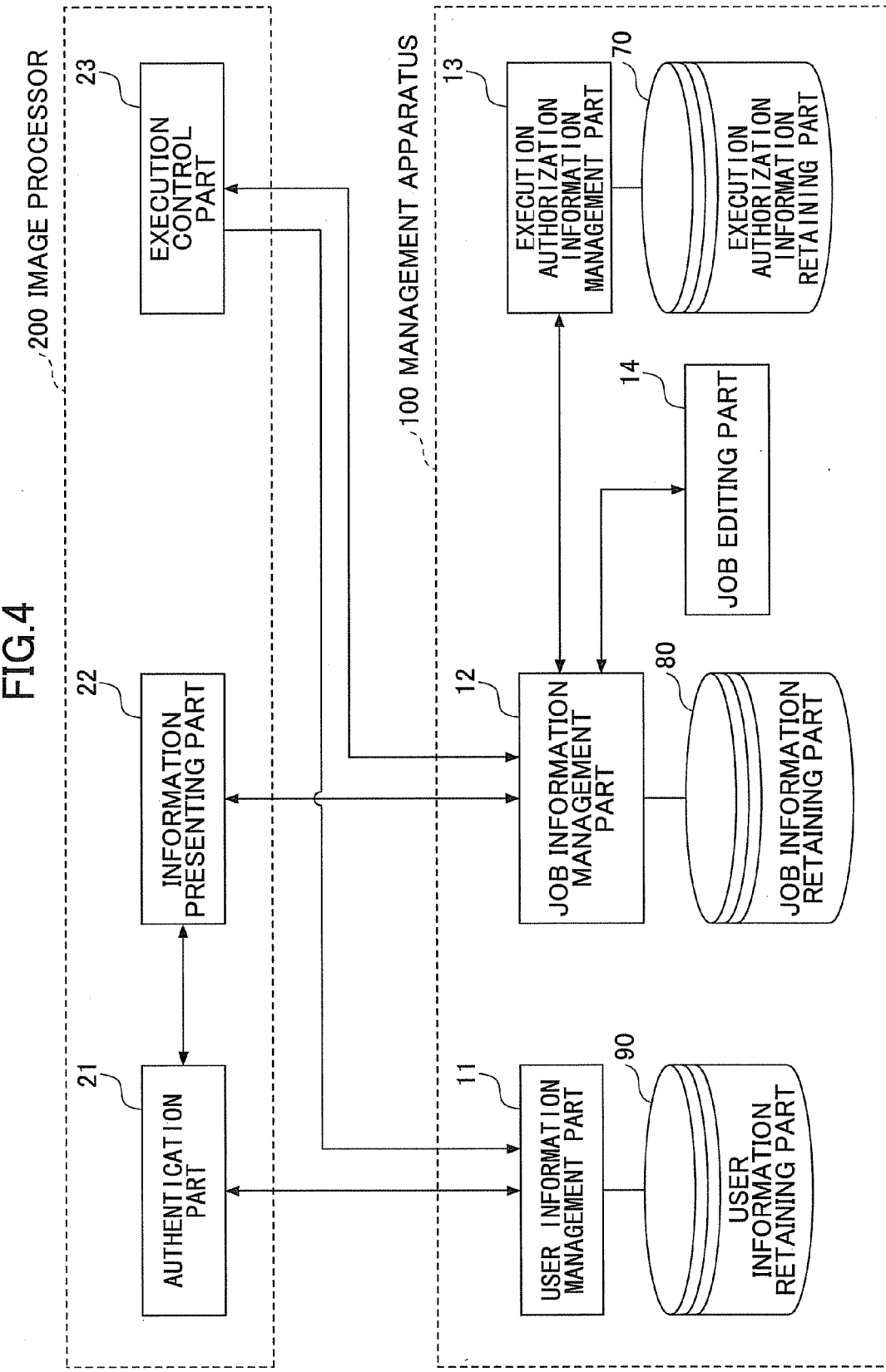
FIG. 4 is a block diagram illustrating a configuration of a job execution management function according to the embodiment of the present invention.

FIG. 4 is a block diagram illustrating a configuration of a job execution management function according to this embodiment.

Referring to FIG. 4, the job execution management function according to this embodiment includes a user information management part 11, a job information management part 12, an execution authorization information management part 13, a job editing part 14, an authentication part 21, an information presenting part 22, and an execution control part 23.

The user information management part 11, the job information management part 12, the execution authorization information management part 13, and the job editing part 14 are functional parts included in the management apparatus 100. The authentication part 21, the information presenting part 22, and the execution control part 23 are functional parts included in the image processor 200.

Thus, the job execution management function according to this embodiment is implemented by the above-described functional parts of the apparatuses operating in conjunction with one another.

[Image Processor]

The authentication part 21 is a functional part that performs user authentication. When receiving an authentication request, the authentication part 21 requests the management apparatus 100 to perform user authentication in response to the authentication request. At this point, the authentication part 21 requests authentication by transmitting logon information received (input) at the time of receiving the authentication request to the management apparatus 100. As a result, the management apparatus 100 returns an authentication result (user information) to the authentication part 21. The authentication part 21 determines whether to authorize usage of the apparatus (information processor 200) based on the authentication result. The term "logon user" used in the description of this embodiment means a user who is authorized to use the apparatus by the authentication part 21.

The information presenting part 22 is a functional part that presents a user with various kinds of information. In response to receiving an information presentation request, the information presenting part 22 requests the management apparatus 100 to obtain information to be presented. For example, it is assumed that the information presenting part 22 has received a request to display the job list of a logon user. In this case, the information presenting part 22 obtains the user identification information of the logon user from the authentication part 21, transmits the obtained user identification information to the management apparatus 100, and requests the obtaining of the requested information. As a result, the management apparatus 100 returns a job list (a job information group) to the information presenting part 22. The information presenting part 22 displays an information presentation screen (a job list screen) on the operations panel 220 (FIG. 3) based on the job list.

The execution control part 23 is a functional part that controls execution of a job (job execution). In response to receiving an execution request, the execution control part 23 requests the management apparatus 100 to obtain the job data of a job to be executed. At this point, the execution control part 23 transmits the job identification information of the job to be executed, selected and instructed to be executed via the information presentation screen, to the management apparatus 100, and requests the obtaining of the requested job data. As a result, the management apparatus 100 returns corresponding stored job data to the execution control part 23. The execution control part 23 executes the obtained job data.

Further, the execution control part 23 requests the management apparatus 100 to update a usage history due to execution of a job. At this point, the execution control part 23 generates update information, transmits the generated update information to the management apparatus 100, and requests the updating of the usage history. The update information includes the user identification information of a user for whom a usage history (usage record) due to execution of the job is to be recorded (hereinafter referred to as "usage history recording target user identification information") and an apparatus usage value (a value indicating usage of the apparatus [the information processor 200]) at the time of execution of the job. As a result, the management apparatus 100 updates, with the apparatus usage value, the usage history of a user specified based on the user identification information.

The usage history recording target user identification information may be obtained from the job list obtained from the management apparatus 100, based on the job identification information of the job selected and instructed to be executed. That is, the job list includes the usage history recording target user identification information of a stored job identified by the job identification information.

The execution control part 23 includes the usage history recording target user identification information in the update information for the following reason.

The conventional job execution management method has the following problem. Conventionally, a user and a corresponding usage history are managed in correlation with each other. When a user executes a stored job, an apparatus usage value due to execution of the job is recorded in the usage history of the user. That is, the apparatus usage value is recorded in the usage history of the user who has executed the job.

However, in the case of using the image processor 200, the following situation may be considered. For example, a user A may be requested by a user B to execute a stored job of the user B. In this case, an apparatus usage value due to execution of a job is recorded as the usage history of the user A. In the case of such job execution, technically, the apparatus usage value is desired to be recorded in the usage history of the user B, who has requested execution of the job. Such a problem also occurs in cases other than the above-described case, such as when one user possesses multiple logon accounts. Therefore, the execution control part 23 transmits the usage history recording target user identification information correlated with the job identification information of the executed job to the management apparatus 100, and requests the updating of the usage history.

[Management Apparatus]

The user information management part 11 is a functional part that manages user information through predetermined data manipulations. The user information, which is information on users to whom the job execution management service is provided, is recorded and retained in a user information retaining part 90. The user information retaining part 90 corresponds to a predetermined storage area of a storage device of the management apparatus 100.

Here, a description is given of the user information.

FIG. 5 is a diagram illustrating example data of user information 90D according to this embodiment.

Referring to FIG. 5, the user information 90D includes one or more information sets each correlating multiple information items such as User Identification, Authentication, Right of Usage, Usage History, and Usage Upper Limit, and manages these information sets on a user basis.

The item "User Identification" retains user identification information that identifies a user. Examples of its item value include an identifier uniquely assigned to a user (a user ID). The item "Authentication" retains the authentication information of a user. Examples of its item value include an authentication value (password) used at the time of user authentication. The item "Right of Usage" retains the usage right information of a user. Examples of its item value include a list of functions (data in the form of one or more function identifiers) that a user is authorized to use (access). The item "Usage History" retains the usage history information of a user. Examples of its item value include a usage history value due to the usage of an apparatus by a user (the accumulation of the respective apparatus usage values of executed jobs). The item "Usage Upper Limit" retains information on the upper limit of usage of a user. Examples of its item value include an upper limit value of usage assigned to a user (a reference value for determining the upper limit of usage [a threshold]).

Referring back to FIG. 4, in response to receiving a request as described below, the user information management part 11 accesses the user information retaining part 90 to refer to the user information 90D, and manipulates data of the user information 90D in accordance with the request.

For example, in response to receiving an information recording request, the user information management part 11 records the user identification information, the authentication information, the usage right information, and the usage upper limit information received at the time of receiving the request as the item values of the corresponding information items of the user information 90D. As a result, a new information set (record) is generated in the user information 90D. Further, at this point, a default value ("0") is recorded as the item value of the item "Usage History."

Further, in response to receiving an information obtaining request, the user information management part 11 refers to the user information 90D based on the user identification information received at the time of receiving the request, and identifies a corresponding information set. The user information management part 11 obtains a corresponding information item value of the identified information set, and returns the obtained information item value to the requestor.

For example, in response to receiving an authentication request from the authentication part 21 of the image processor 200, the user information management part 11 refers to the user information 90D based on the user identification information included in the logon information received at the time of receiving the request, and identifies a corresponding information set. The user information management part 11 compares the authentication information of the identified information set and the authentication information included in the logon information received at the time of receiving the request. If the authentication information of the identified information set matches the authentication information included in the logon information, the user information management part 11 returns the user information 90D of the information set to the requestor (the authentication part 21) as an authentication result.

Further, in response to receiving an information updating request, the user information management part 11 refers to the user information 90D based on the user identification information received at the time of receiving the request, and identifies a corresponding information set. The user information management part 11 updates (replaces) a corresponding information item value of the identified information set with predetermined information received at the time of receiving the request.

For example, in response to receiving a usage history updating request from the execution control part 23 of the image processor 200, the user information management part 11 refers to the user information 90D based on the user identification information included in the update information received at the time of receiving the request, and identifies a corresponding information set. The user information management part 11 updates the usage history information of the identified information set using the apparatus usage value included in the update information received at the time of receiving the request (that is, the user information management part 11 updates the usage history information of the identified information set to a value obtained by adding the apparatus usage value to the value of the usage history information).

The job information management part 12 is a functional part that manages job information through predetermined data manipulations. The job information, which is information on the job stored in the management apparatus 100, is recorded and retained in a job information retaining part 80. The job information retaining part 80 corresponds to a predetermined storage area of a storage device of the management apparatus 100.

Here, a description is given of the job information.

FIG. 6 is a diagram illustrating example data of job information 80D according to this embodiment.

Referring to FIG. 6, the job information 80D includes one or more information sets each correlating multiple information items such as Job Identification, Storing User Identification, Bibliography, and Storage Destination, and manages these information sets on a job basis.

The item "Job Identification" retains job identification information that identifies a stored job. Examples if its item value include an identifier (job ID) issued at the time of storage of a job. The item "Storing User Identification" retains user identification information that identifies a user who has stored a job. The item "Bibliography" retains the bibliographic information of a stored job. Examples of its item values include bibliographic item values obtained from job data (or information added to job data) at the time of storage of a job. Examples of bibliographic item values include the filename and the number of pages of a stored job and the execution condition setting values (a copy number setting and a color setting) of the stored job. The item "Storage Destination" retains the storage destination information of job data. Examples of its item value include a data path to stored job data.

Referring back to FIG. 4, in response to receiving a request as described below, the job information management part 12 accesses the job information retaining part 80 to refer to the job information 80D, and manipulates data of the job information 80D in accordance with the request.

For example, in response to receiving a job recording request, the job information management part 12 stores job data received at the time of receiving the request in a predetermined storage area, issues job identification information, and obtains bibliographic information from the job data. The job information management part 12 records the issued job identification information, the obtained bibliographic information, and the storage destination information of the job data as the item values of the corresponding information items of the job information 80D. As a result, a new information set (record) corresponding to the stored job data is generated in the job information 80D.

Further, in response to receiving an information obtaining request, the job information management part 12 refers to the job information 80D based on the user identification information received at the time of receiving the request, and identifies a corresponding information set. The job information management part 12 obtains a corresponding information item value of the identified information set, and returns the obtained information item value to the requestor.

For example, in response to a job list obtaining request from the information presenting part 22 of the image processor 200, the job management part 12 refers to the job information 80D based on the user identification information of a logon user received at the time of receiving the request and below-described execution authorizing user identification information (the user identification information of a user who has authorized the logon user to execute a job) obtained from the execution authorization information management part 13, and identifies a corresponding information set. The job information management part 12 generates a job list based on the job information 80D of the identified information set and below-described usage history recording target user identification information (the user identification information of a user for whom a usage history due to execution of a job is to be recorded) obtained from the execution authorizing information management part 13. The job information management part 12 returns the generated job list. That is, the job information management part 12 returns a job list that covers the stored job(s) of the logon user and the stored job(s) of a user who has authorized the logon user to execute a job to the requestor (the information presenting part 22).

Further, in response to receiving a job obtaining request, the job information management part 12 refers to the job information 80D based on the job identification information received at the time of receiving the request, and identifies a corresponding information set. The job information management part 12 obtains corresponding job data based on the storage destination information of the identified information set, and responds to the requestor.

For example, in response to receiving a job obtaining request from the execution control part 23 of the image processor 200, the job information management part 12 refers to the job information 80D based on the job identification information of a job to be executed, received at the time of receiving the request, and identifies a corresponding information set. The job information management part 12 obtains corresponding job data based on the storage destination information of the identified information set, and edits the obtained job data based on the usage history recording target user identification information received at the time of receiving the request. The job information management part 12 returns the edited job data to the requestor (the execution control part 23).

The job data are edited by the job editing part 14. Therefore, the job information management part 12 passes the job data and the usage history recording target user identification information to the job editing part 14, and instructs the job editing part 14 to edit the job data. In response to receiving the editing instruction from the job information management part 12, the job editing part 14 refers to the header part of the job data received at the time of receiving the instruction, and edits the user identification information of a user who has stored the job data based on the usage history recording target user identification information received at the time of receiving the instruction (the job editing part 14 replaces the user identification information in the header part with the received usage history recording target user identification information).

The execution authorization information management part 13 is a functional part that manages execution authorization information through predetermined data manipulations. The execution authorization information, which manages the correspondence between a logon user and a user who has authorized the logon user to execute a job, is recorded and retained in an execution authorization information retaining part 70. The execution authorization information retaining part 70 corresponds to a predetermined storage area of a storage device of the management apparatus 100.

Here, a description is given of the execution authorization information.

FIG. 7 is a diagram illustrating example data of execution authorization information 70D according to this embodiment.

Referring to FIG. 7, the execution authorization information 70D includes one or more information sets each correlating multiple information items such as Logon User Identification, Execution Authorizing User Identification, and Usage History Recording Target User Identification, and manages these information sets on a user basis.

The item "Logon User Identification" retains the user identification information of a logon user (hereinafter referred to as "logon user identification information"). The item "Execution Authorizing User Identification" retains execution authorizing user identification information, that is, the user identification information of a user who has authorized the logon user to execute a job (an execution authorizing user). The item "Usage History Recording Target User Identification" retains usage history recording target user identification information, that is, the user identification information of a user for whom a usage history due to execution of a job is to be recorded (a history recording target user).

The execution authorization information 70D may be managed with multiple execution authorizing user identification information items and usage history recording target user identification information items being correlated with a single logon user identification information item. That is, the execution authorization information 70D may be managed with multiple other users who have authorized a single user to execute a job being correlated with the single user. Further, the execution authorization information 70D may be managed with multiple logon accounts with respect to which a single user has authorized her/his stored jobs to be executed being correlated with the single user.

Referring back to FIG. 4, in response to receiving a request as described below, the execution authorization information management part 13 accesses the execution authorization information retaining part 70 to refer to the execution authorization information 70D, and manipulates data of the execution authorization information 70D in accordance with the request.

For example, in response to receiving an information recording instruction, the execution authorization information management part 13 records logon user identification information, one or more execution authorizing user identification information items, and one or more usage history recording target user identification information items received at the time of receiving the instruction as the item values of the corresponding information items of the execution authorization information 70D. As a result, a new information set (record) that correlates a logon user, one or more execution authorizing users, and one or more usage history recording target users is generated in the execution authorization information 70D.

Further, in response to receiving an information obtaining instruction, the execution authorization information management part 13 refers to the execution authorization information 70D based on the logon user identification information received at the time of receiving the instruction, and identifies a corresponding information set. The execution authorization information management part 13 obtains a corresponding information item value of the identified information set, and returns the obtained information item value to the requestor.

For example, in response to receiving an information obtaining instruction from the job information management part 12, the execution authorization information management part 13 refers to the execution authorization information 70D based on the logon user identification information received at the time of receiving the instruction, and identifies a corresponding information set. The execution authorization information management part 13 returns one or more execution authorizing user identification information items and one or more usage history recording target user identification information items of the identified information set to the instructor (the job information management part 12).

Thus, according to the job execution management function of this embodiment, the management apparatus 100 manages the correlation between a first user and a second user who has authorized the first user to execute a job, and returns a job list that covers the stored job(s) of a logon user and the stored job(s) of a user with whom the logon user is correlated to the requesting image processor 200 (requestor).

Thus, the job execution management function according to this embodiment is implemented by the above-described functional parts operating in conjunction with one another. The above-described functional parts are implemented by reading a program (software implementing the job execution management function) installed in each of the apparatuses (100 and 200) of the management system 1 from a storage device (such as an HDD or a ROM) into a memory (RAM) and executing the program by a processor (CPU) so that the following process is executed in the apparatuses.

A description is given below, with reference to a sequence diagram illustrating an operating procedure, of a detailed operation (a conjunct operation of a group of functional parts) of the job execution management function according to this embodiment. In the following, the operating procedure of the job execution management function is described by substantially dividing the job execution management function into two processes. That is, a description is given first of a process up to displaying a job list obtained from the management apparatus 100 by the image processor 200 and then of a process up to execution of job data obtained from the management apparatus 100 by the image processor 200.

[Process up to Display of Job List]

Figure 8:
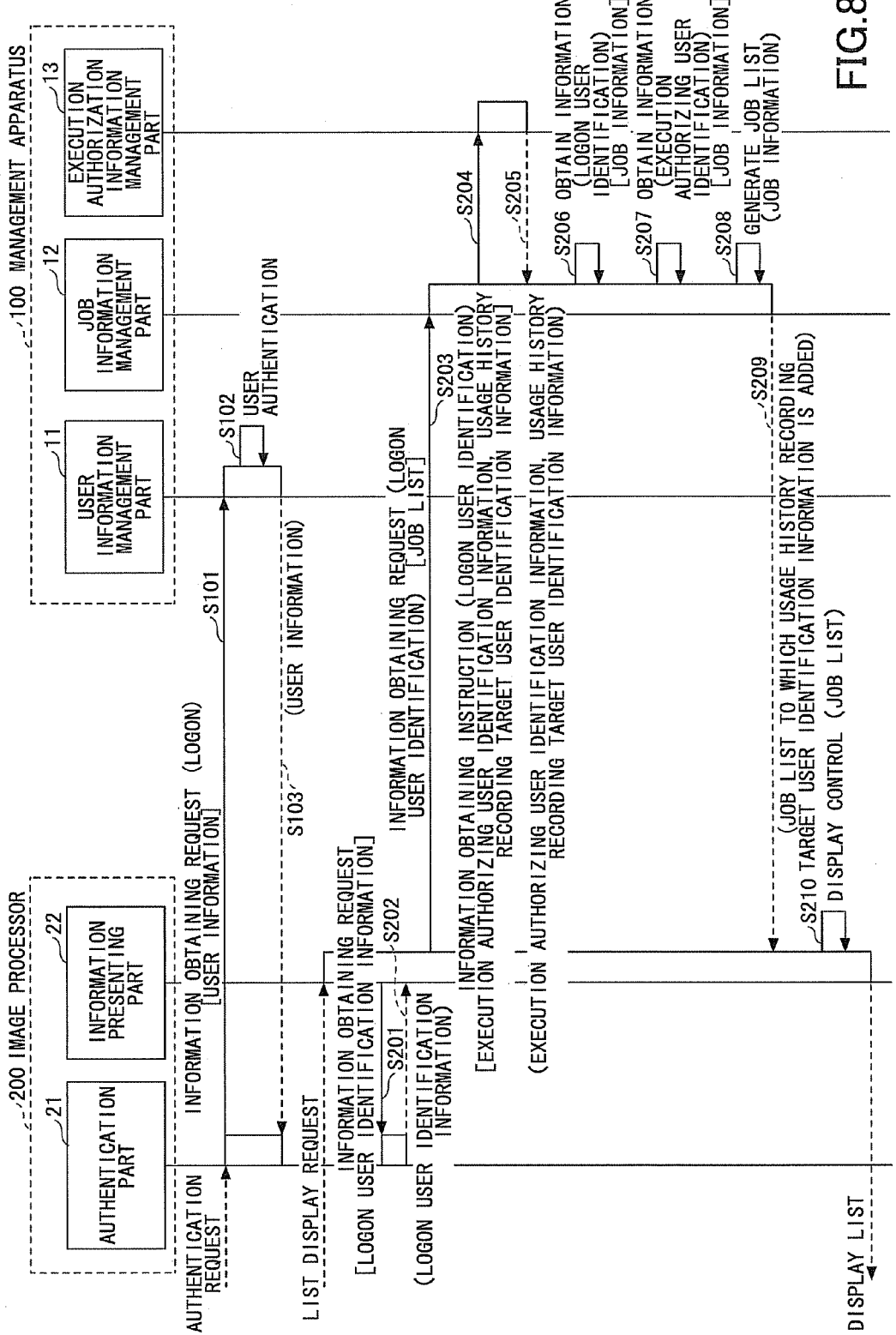
FIG. 8 is a sequence diagram illustrating part of an operating procedure of job execution management according to the embodiment of the present invention.

FIG. 8 is a sequence diagram illustrating part of an operating procedure of the job execution management according to this embodiment.

Referring to FIG. 8, in response to receiving an authentication request from a user to log on via a logon screen, in step S101, the authentication part 21 performs user authentication. The authentication part 21 transmits logon information to the management apparatus 100 (the user information management part 11), and requests to obtain user information as an authentication result.

In response, in step S102, in the management apparatus 100, the user information management part 11 accesses the user information retaining part 90 and refers to the user information 90D, and performs user authentication based on the received logon information and the user information 90D. The user information management part 11 identifies a corresponding information set of the user information 90D based on the user identification information of the logon information, and compares the authentication information of the identified information set with the authentication information of the logon information. As a result, if the authentication information of the identified information set matches the authentication information of the logon information (YES in step S102), in step S103, the user information management part 11 returns the user information 90D of the identified information set to the image processor 200 (the authentication part 21) as an authentication result. If the authentication information of the identified information set does not match the authentication information of the logon information (NO in step S102), the user information management part 11 reports an authentication failure to the image processor 200 (the authentication part 21).

As a result, in the image processor 200, the authentication part 21 receives the authentication result from the management apparatus 100 (the user information management part 11), and retains the authentication result in a predetermined storage area. At this point, in response to receiving an authentication failure as an authentication result, the image processor 200 notifies a user of the authentication failure (the image processor 200 displays a message indicating an authentication failure on an authentication result screen). In response to receiving user information as an authentication result, the image processor 200 enables a graphical user interface (GUI) disposed on the screen, which instructs transition to a job list screen (for example, the image processor 200 displays a display button).

Next, in response to receiving a job list display request through the GUI, in step S201, in the image processor 200, the information presenting part 22 instructs the authentication part 21 to obtain logon user identification information. As a result, in step S202, the authentication part 21 obtains user identification information from the retained user information, and passes the obtained user information to the information presenting part 22 as logon user identification information.

In step S203, the information presenting part 22 transmits the logon user identification information to the management apparatus 100 (the job information management part 11), and requests the obtaining of a job list of the logon user.

In response, in step S204, in the management apparatus 100, the job information management part 12 passes the received logon user identification information to the execution authorization information management part 13, and gives an instruction to obtain the user identification information of an execution authorizing user and a usage history recording target user correlated with the logon user. As a result, in step S205, the execution authorization management part 13 accesses the execution authorization information retaining part 70, refers to the execution authorization information 70D based on the received logon user identification information, obtains the execution authorizing user identification information and the user history recording target user identification information correlated with the logon user identification information from the execution authorization information 70D, and passes the obtained execution authorizing user identification information and user history recording target user identification information to the job information management part 12. At this point, the execution authorization information management part 13 identifies a corresponding information set of the execution authorization information 70D based on the logon user identification information, and obtains the execution authorizing user identification information and the user history recording target user identification information of the identified information set.

As a result, the job information management part 12 has obtained the user identification information of the logon user, the execution authorizing user who has authorized the logon user to execute a job, and the usage history recording target user for whom a usage history due to execution of the job is to be recorded. For example, if the logon user is a user A, the job information management part 12 obtains "User A" as the logon user identification information from the image processor 200 (the information presenting part 22) in the above-described process of step S203. Further, for example, when the execution authorization information management part 13 manages the execution authorization information 70D as illustrated in FIG. 7, the job information management part 12 obtains "User B" as the execution authorizing user identification information and "User B" as the usage history recording target user identification information from the execution authorization information management part 13 in the above-described processes of steps S204 and S205.

Next, in the management apparatus 100, the job information management part 12 accesses the job information retaining part 80 and refers to the job information 80D, and generates a job list by executing the following process based on the above-described user identification information and the job information 80D.

Figure 9:
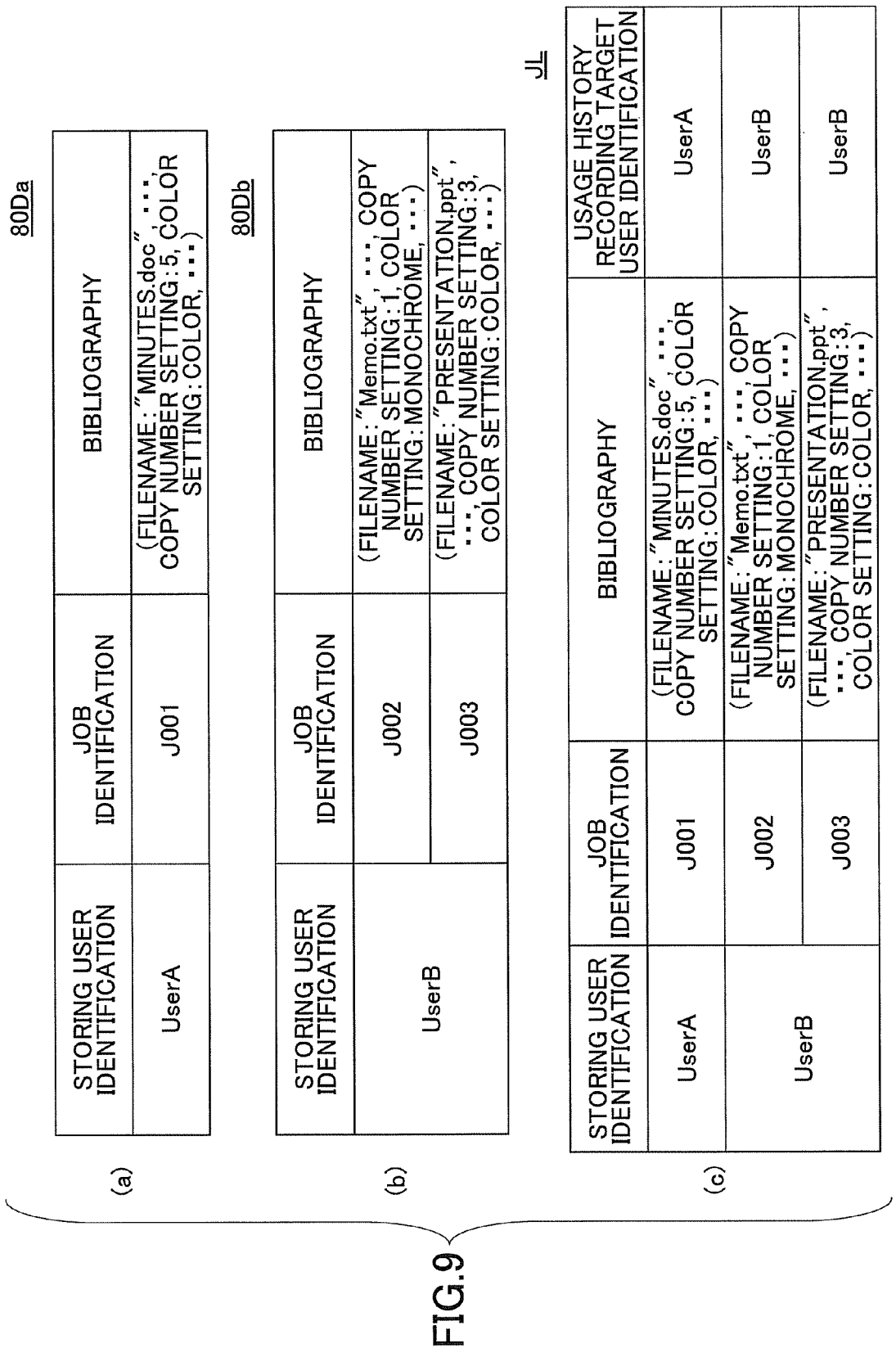
FIG. 9 is a diagram illustrating data manipulation at the time of generating a job list according to the embodiment of the present invention.

FIG. 9 is a diagram illustrating data manipulation at the time of generating a job list according to this embodiment.

FIG. 9 illustrates data manipulation in the case of generating a job list JL (illustrated in (c)) based on the job information 80D as illustrated in FIG. FIG. 6 when the logon user is User A. A description is given of the following process using the data manipulation illustrated in FIG. 9.

In step S206 of FIG. 8, the job information management part 12 obtains job information 80Da (illustrated in (a) of FIG. 9) of the logon user from the job information 80D based on the logon user identification information. For example, in the case where the job information 80D is composed of data illustrated in FIG. 6, the job information 80Da illustrated in (a) of FIG. 9 is obtained based on the logon user identification information "User A."

Next, in step S207, the job information management part 12 obtains job information 80Db (illustrated in (b) of FIG. 9) of the execution authorizing user from the job information 80D based on the execution authorizing user identification information. For example, in the case where the job information 80D is composed of data illustrated in FIG. 6, the job information 80Db illustrated in (b) of FIG. 9 is obtained based on the execution authorizing user identification information "User B."

Next, in step S208, the job information management part 12 generates the job list JL based on the obtained job information 80D. For example, the job information management part 12 combines the data of the job information 80Da of the logon user and the job information 80Db of the execution authorizing user, and integrates the data on an information item basis (the integration of the data of (a) and (b) of FIG. 9). Further, at this point, the job information management part 12 adds the usage history recording target user identification information to each of the jobs included in the job list JL. For example, to a job of the logon user A, the logon user identification information "User A" is added as the usage history recording target user identification information because the logon user is the usage history recording target user. Further, to a job of the execution authorizing user B, the usage history recording target user identification information "User B" obtained in the above-described processes of steps S204 and S205 is added. As a result, the job list JL as illustrated in (c) of FIG. 9 is generated.

In step S209, the management apparatus 100 returns the job list JL generated by the job information management part 12 (a job list to which the usage history recording target user identification information is added) to the image processor 200 (the information presenting part 22).

As a result, in step S210, in the image processor 200, the information presenting part 22 performs display control of the operations panel 220 and displays the received job list JL.

Thereby, the management system 1 according to this embodiment provides an environment in which it is possible to select any stored job that a logon user is authorized to execute as a job to be executed and to give an instruction to execute the stored job.

[Process up to Job Execution]

Figure 10:
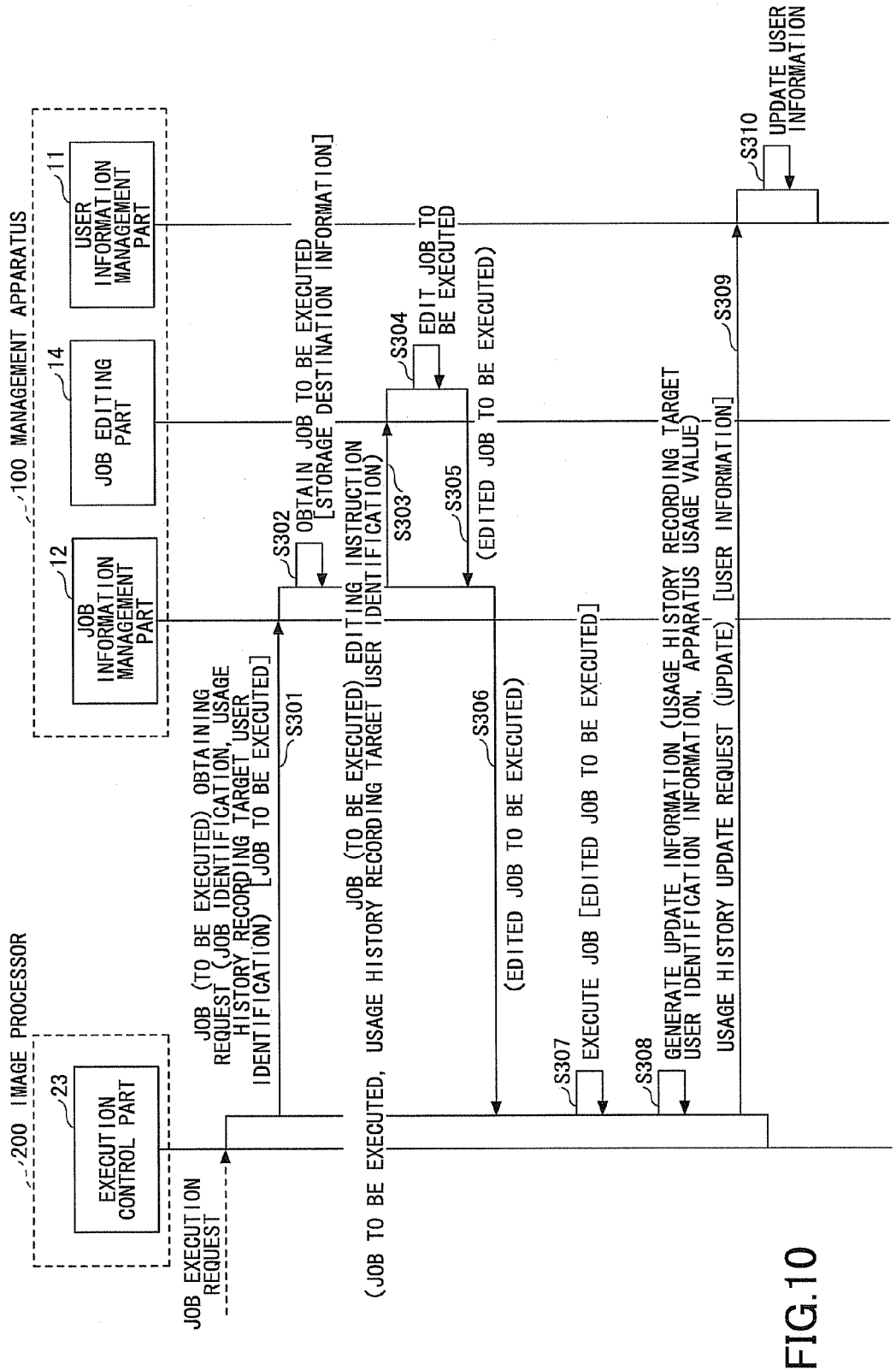
FIG. 10 is a sequence diagram illustrating another part of the operating procedure of the job execution management according to the embodiment of the present invention.

FIG. 10 is a sequence diagram illustrating another part of the operating procedure of the job execution management according to this embodiment.

Referring to FIG. 10, in response to receiving, through a job list screen, a request to execute a job selected and instructed to be executed by a logon user, in step S301, in the image processor 200, the execution control part 23 transmits job identification information and usage history recording target user identification information to the management apparatus 100 (the job information management part 12), and requests the obtaining the job data of the job to be executed. The transmitted job identification information and usage history recording target user identification information are included in the displayed job list JL. Accordingly, receiving the selection of a job to be executed and an instruction to execute the job from the logon user makes it possible for the execution control part 23 to obtain corresponding job identification information and usage history recording target user identification information correlated with the job identification information from the job list JL.

In response, in step S302, in the management apparatus 100, the job information management part 12 obtains the job data of the job to be executed stored in a predetermined storage area based on the received job identification information. At this point, in the management apparatus 100, the job information management part 12 accesses the job information retaining part 80 and refers to the job information 80D, and identifies a corresponding job set of the job information 80D based on the received job identification information. Then, the job information management part 12 obtains job data in accordance with the storage destination information of the identified information set.

Next, in step S303, the job information management part 12 passes the obtained job data and the received usage history recording target user identification information to the job editing part 14, and instructs the editing part 14 to edit the job data of the job to be executed. As a result, in step S304, the job editing part 14 updates the header of the received job data by replacing (updating) the user identification information of a user who has stored the job in the header with the received usage history recording target user identification information, and in step S305, the job editing part 14 passes the edited job data to the job information management part 12.

In step S306, in the management apparatus 100, the job information management part 12 returns the edited job data (in which the user identification information is replaced with the usage history recording target user identification information) to the image processor 200 (the execution control part 23).

In response, in step S307, in the image processor 200, the execution control part 23 executes the job selected and instructed to be executed by the logon user based on the received edited job data. At this point, the execution control part 23 obtains an apparatus usage value due to the execution of the job.

Upon completion of the execution of the job, in step S308, the execution control part 23 generates update information to update the user information 90D of the usage history recording target user based on the obtained apparatus usage value and the usage history recording target user identification information. At this point, the execution control part 23 generates update information UPD as illustrated in FIG. 11.

FIG. 11 is a diagram illustrating example data of the update information UPD according to this embodiment.

FIG. 11 illustrates example data of the update information UPD generated when the logon user A executes all corresponding jobs from the screen based on the job list JL illustrated in (c) of FIG. 9. The execution control part 23 generates the update information UPD by generating an information set correlating the usage history recording target user identification information, the apparatus usage value, and the execution condition setting value on an executed job basis (for each of executed jobs) and combining the data.

For example, with respect to a job identified by job identification information "J0001," an information set including usage history recording target user identification information "User A", an apparatus usage value "5," and an execution condition setting value "(color, . . . )" is generated in response to its execution. Further, with respect to a job identified by job identification information "J0002," an information set including usage history recording target user identification information "User B", an apparatus usage value "1," and an execution condition setting value "(monochrome, . . . )" is generated in response to its execution. Further, with respect to a job identified by job identification information "J0003," an information set including usage history recording target user identification information "User B", an apparatus usage value "3," and an execution condition setting value "(color, . . . )" is generated in response to its execution. By combining the data of these information sets, the update information UPD as illustrated in FIG. 11 is generated.

In step S309, the image processor 200 transmits the update information UPD generated by the execution control part 23 to the management apparatus 100 (an update information receiving part), and requests the updating of the usage history of the usage history recording target user.

In response, in step S310, in the management apparatus 100, the user information management part 11 accesses the user information retaining part 90 and refers to the user information 90D, and updates the usage history of the usage history recording target user based on the received update information UPD and the user information 90D. At this point, the user information management part 11 identifies a corresponding information set of the user information 90D based on the usage history recording target user identification information of the update information UPD, and updates the usage history information of the identified information set based on the apparatus usage value of the update information UPD. For example, the user information management part 11 replaces the value of the usage history information with a value obtained by adding the apparatus usage value to the value of the usage history information.

Thereby, the management system 1 according to this embodiment provides an environment where an apparatus usage value due to execution of a job may be recorded as the usage history of a user who has requested the execution of the job.

[Variation]

Here, a description is given of a variation of the above-described process of generating a job list according to this embodiment.

Figure 12:
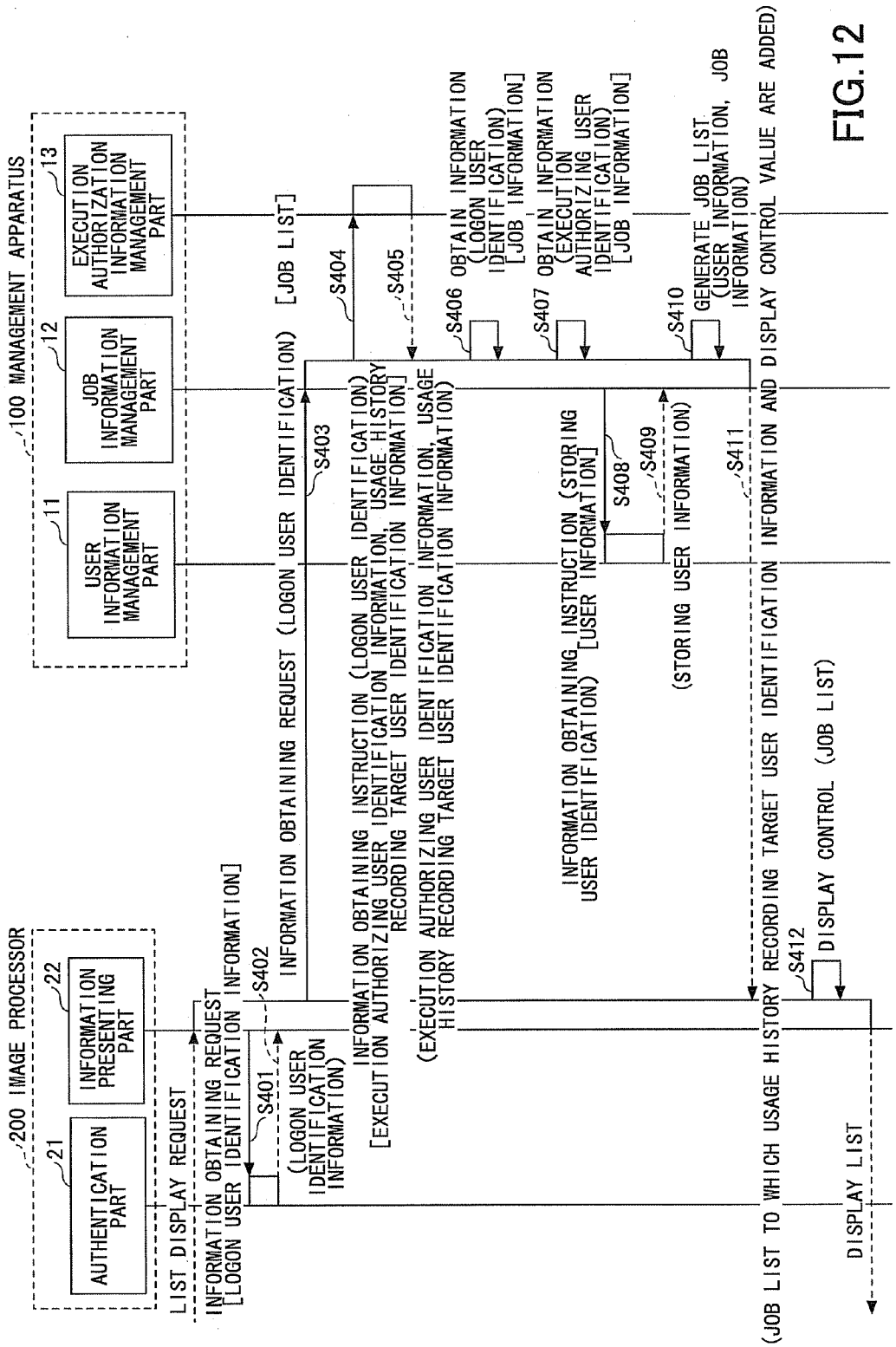
FIG. 12 is a sequence diagram illustrating a management operating procedure according to a variation of the embodiment of the present invention.

FIG. 12 is a sequence diagram illustrating a management operating procedure according to this variation.

The operating procedure illustrated in FIG. 12 is different from the operating procedure illustrated in FIG. 8 in that the management apparatus 100 generates the job list JL by adding a display control value that causes a display mode to change in accordance with the result of determination as to whether the usage upper limit of a user who has stored a job included in the job list JL to be generated is exceeded and/or in accordance with the right of usage of the user, and returns the generated job list JL to the image processor 200. Therefore, in the following, a description is given of a generation process in which the operating procedure of FIG. 12 is different from the operating procedure illustrated in FIG. 8.

Referring to FIG. 12, in step S406, the job information management part 12 obtains the job information 80Da ((a) of FIG. 9) of the logon user from the job information 80D (that the job information management part 12 has referred to) based on the logon user identification information.

Then, in step S407, the job information management part 12 obtains the job information 80Db ((b) of FIG. 9) of the execution authorizing user from the job information 80D (that the job information management part 12 has referred to) based on the execution authorizing user identification information.

Next, in step S408, the job information management part 12 passes the storing user identification information of the obtained job information 80D (80Da and 80Db) to the user information management part 11, and instructs the user information management part 11 to obtain the user information 90D of a user who has stored a job included in the job list JL. As a result, in step S409, the user information management part 11 obtains the corresponding user information 90D, and passes the obtained user information 90D to the job information management part 12. At this point, the user information management part 11 identifies a corresponding information set of the user information 90D (that the user information management part 11 has referred to) based on the received storing user identification information, and obtains the identified information set as the user information 90D of the user who has stored a job included in the job list JL.

Next, in step S410, the job information management part 12 generates the job list JL based on the obtained job information 80D. At this point, the job information management part 12 determines a display control value to control the display mode of a job corresponding to the storing user based on the obtained user information, and adds the determined display control value to each corresponding job.

In step S411, the management apparatus 100 returns the job list JL generated by the job information management part 12 (a job list to which the usage history recording target user identification information and the display control value are added) to the image processor 200 (the information presenting part 22).

As a result, in step S412, in the image processor 200, the information presenting part 22 performs display control of the operations panel 220 in accordance with the received display control value, and displays the received job list JL.

A description is given in more detail below of the process of adding a display control value in step S410 described above.

Figure 13:
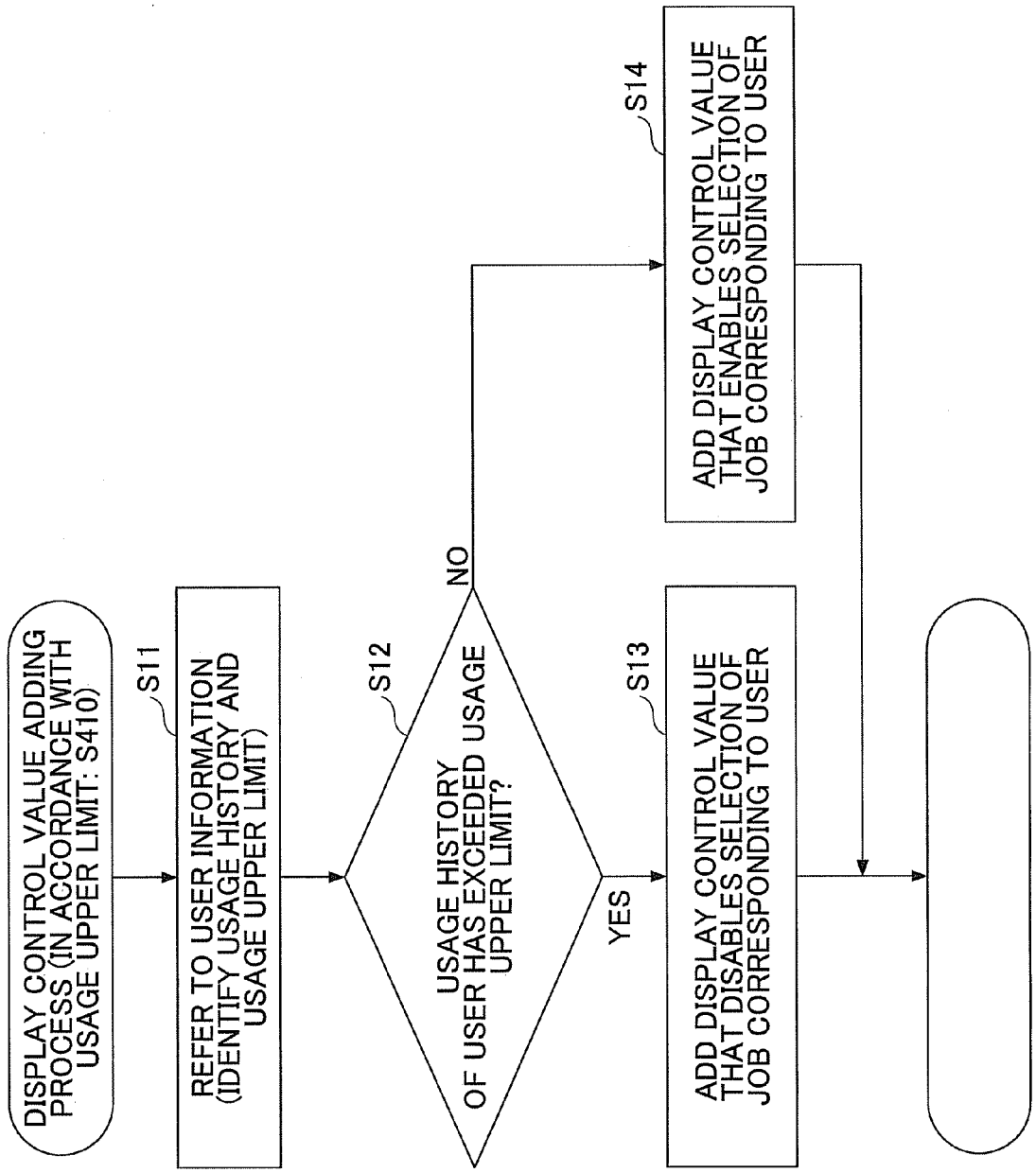
FIG. 13 is a flowchart illustrating a first example of an operating procedure for adding a display control value according to the variation of the embodiment of the present invention.

FIG. 13 is a flowchart illustrating a first example of the operating procedure for adding a display control value according to this variation. FIG. 13 illustrates an operating procedure for determining and adding a display control value in accordance with the usage upper limit of a user.

Referring to FIG. 13, in step S11, the job information management part 12 refers to the user information 90D of a user who has stored a job included in the job list JL, and identifies usage history information and usage upper limit information.

Next, in step S12, the job information management part 12 compares the usage history information and the usage upper limit information, and determines, based on a comparison result, whether the usage history of the storing user has exceeded the usage upper limit.

As a result, in response to determining that the usage history of the storing user has exceeded the usage upper limit (YES in step S12), in step S13, the job information management part 12 determines a display control value that disables selection of the corresponding job of the user on the job list screen, and adds the determined display control value to the corresponding job information 80D, correlating the determined display control value with the corresponding job information 80D.

In response to determining that the usage history of the storing user has not exceeded the usage upper limit (NO in step S12), in step S14, the job information management part 12 determines a display control value that enables selection of the corresponding job of the user on the job list screen, and adds the determined display control value to the corresponding job information 80D, correlating the determined display control value with the corresponding job information 80D.

The job information management part 12 repeats the above-described process from step S11 up to step S13 or S14 as many times as the number of information sets obtained of the user information 90D.

Thereby, in the image processor 200, it is possible to display a job list screen in, for example, such a display mode as illustrated in FIG. 14A or 14B.

FIGS. 14A and 14B are diagrams illustrating display examples of the job list screen according to this variation.

FIGS. 14A and 14B illustrate display examples of the job list screen where selection of a stored job of a user whose usage history has exceeded a usage upper limit is disabled. For example, FIG. 14A illustrates a job list screen W1, which is a display example in the case where the usage history of the user A has exceeded the usage upper limit, and FIG. 14B illustrates a job list screen W2, which is a display example in the case where the usage history of the user B has exceeded the usage upper limit. Examples of the display control method that disables (prevents) selection include a method that displays the corresponding job information 80D by half-bright highlighting or a method that does not display the corresponding job information 80D.

Thus, according to this variation, it is possible to change a display mode in accordance with the result of determination as to whether the usage upper limit of a user who has stored a job included in the job list JL has been exceeded.

Figure 15:
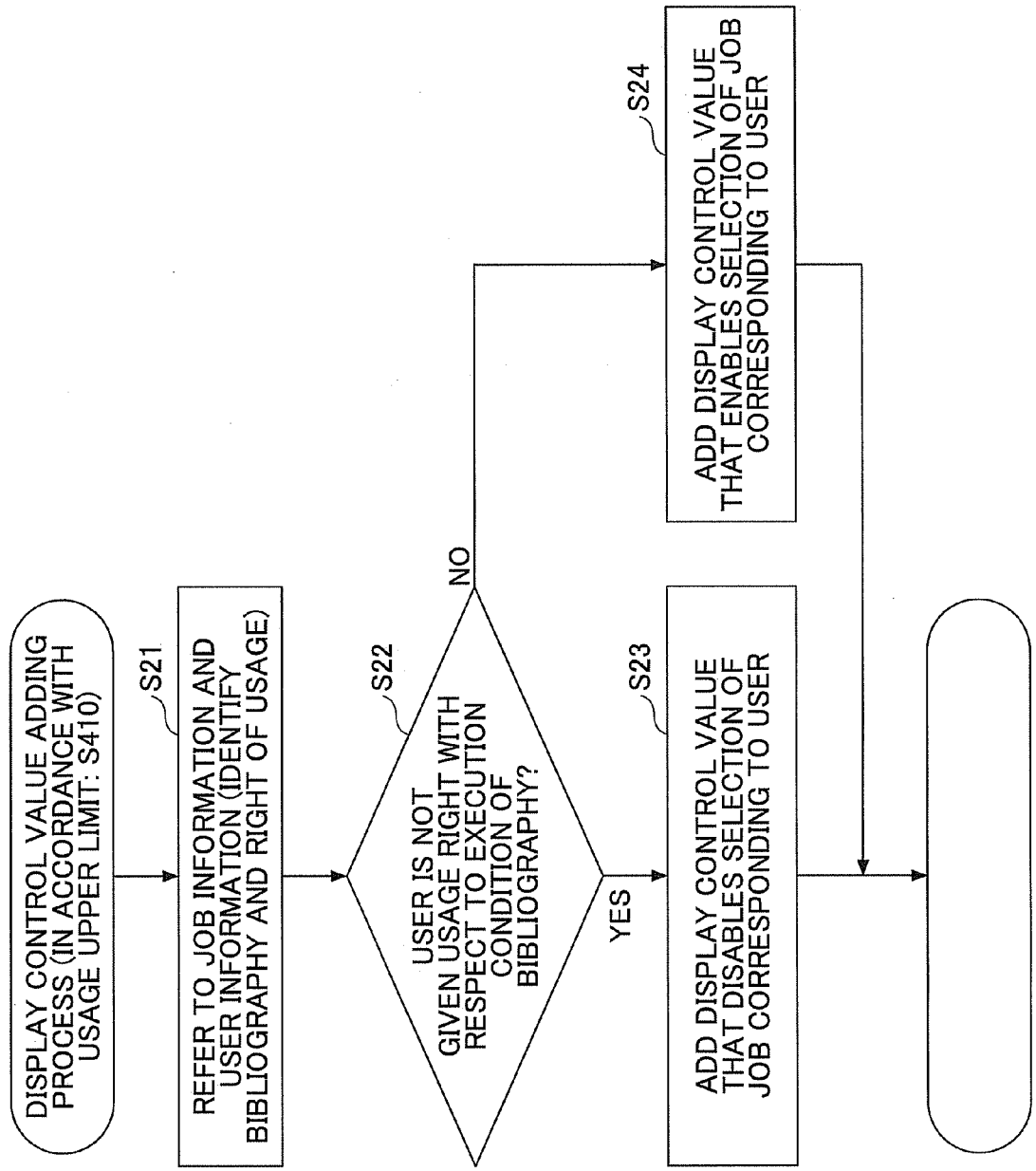
FIG. 15 is a flowchart illustrating a second example of the operating procedure for adding a display control value according to the variation of the embodiment of the present invention.

FIG. 15 is a flowchart illustrating a second example of the operating procedure for adding a display control value according to this variation. FIG. 15 illustrates an operating procedure for determining and adding a display control value in accordance with the right of usage of a user.

Referring to FIG. 15, in step S21, the job information management part 12 refers to the job information 80D of a job included in the job list JL and the user information 90D of a user who has stored the job, and identifies bibliographic information and usage right information.

Next, in step S22, the job information management part 12 determines whether the user is not given a usage right with respect to the execution condition of the job based on the execution condition setting value of the bibliographic information and the usage right information.

As a result, in response to determining that the user is not given a usage right with respect to the execution condition of the job (YES in step S22), in step S23, the job information management part 12 determines a display control value that disables selection of the corresponding job of the user on the job list screen, and adds the determined display control value to the corresponding job information 80D, correlating the determined display control value with the corresponding job information 80D.

In response to determining that the user is given a usage right with respect to the execution condition of the job (NO in step S22), in step S24, the job information management part 12 determines a display control value that enables selection of the corresponding job of the user on the job list screen, and adds the determined display control value to the corresponding job information 80D, correlating the determined display control value with the corresponding job information 80D.

The job information management part 12 repeats the above-described process from step S21 up to step S23 or S24 as many times as the number of information sets obtained of the user information 90D.

Thereby, in the image processor 200, it is possible to display a job list screen in, for example, such a display mode as illustrated in FIG. 16A or 16B.

FIGS. 16A and 16B are diagrams illustrating display examples of the job list screen according to this variation.

FIGS. 16A and 16B illustrate display examples of the job list screen where selection of a stored job of a user who is not given a usage right (a user who is not authorized to use the image processor 200) with respect to the execution condition of the job is disabled. For example, FIG. 16A illustrates a job list screen W3, which is a display example in the case where the user A is not authorized to use (access) a color printing function, and FIG. 16B illustrates a job list screen W4, which is a display example in the case where both the user A and the user B are not authorized to use (access) a color printing function.

Thus, according to this variation, it is possible to change a display mode in accordance with the right of usage of a user who has stored a job included in the job list JL.

In addition to the processes illustrated in the above-described variation, a process may be executed to add the following information to the job list JL.

For example, in the case of the process according to the result of determination as to whether the usage upper limit has been exceed, as the usage history recording target user identification information of a job corresponding to a user whose usage history has exceed the usage upper limit, the user identification information of an execution authorizing user whose usage history has not exceed the usage upper limit among execution authorizing users who have authorized the user to execute a job may be added to the job list JL. For example, in the case of the job list screen W1 illustrated in FIG. 14A, the user identification information "User B" of the user B is added to the job list JL in place of the usage history recording target user identification information "User A" of the job corresponding to the user A.

Further, in the case of the process according to the right of usage, as the usage history recording target user identification information of a job corresponding to a user who is not given a usage right, the user identification information of an execution authorizing user who is given a usage right among execution authorizing users who have authorized the user to execute a job may be added to the job list JL. For example, in the case of the job list screen W3 illustrated in FIG. 16A, the user identification information "User B" of the user B is added to the job list JL in place of the usage history recording target user identification information "User A" of the job corresponding to the user A.

Thus, according to the management system 1 of this embodiment, in the management apparatus 100, the execution authorization information management part 13 manages the correlation between a first user and a second user who has authorized the first user to execute a job. In the image processor 200, the information presenting part 22 requests the management apparatus 100 to obtain a job list of a logon user. As a result, the management apparatus 100 returns the job list JL that covers the stored job(s) of the logon user and the stored job(s) of a user correlated with the logon user through a conjunct operation of the job information management part 12 and the execution authorization information management part 13.

Thereafter, in the image processor 200, in response to the information presenting part 22 receiving selection of a job to be executed and an instruction to execute the job by the logon user, the execution control part 23 requests the management apparatus 100 to obtain the data of the job to be executed. As a result, from the management apparatus 100, the job information management part 12 returns corresponding stored job data. Thereafter, in the image processor 200, the execution control part 23 executes the job data, notifies the management apparatus 100 of a user who is a target of usage history recording due to the execution of the job, and requests the management apparatus 100 to update the usage history. As a result, in the management apparatus 100, the user information management part 11 updates the usage history of the corresponding user.

As a result, it is possible for the management system 1 according to this embodiment to provide an environment in which it is possible to select any stored job that a logon user is authorized to execute as a job to be executed and to give an instruction to execute the stored job, and to implement a highly convenient job execution management service.

The "job execution management function" according to the above-described embodiment may be implemented by executing a program into which the operating procedures described with reference to the drawings are coded with a programming language suitable for an operating environment (platform) by the processors (CPUs) of the apparatuses (such as the management apparatus 100 and the image processor 200) of the printing control system 1.

This program may be stored (recorded) in the computer-readable recording medium 103*a* (FIG. 2) and the computer-readable recording medium 214*a* (FIG. 3). Thereby, for example, in the case of the management apparatus 100, the program may be installed in the management apparatus 100 via the external device I/F 103 (FIG. 2). Further, since the management apparatus 100 includes the communications I/F 107, the program may be downloaded using a telecommunications line to be installed in the management apparatus 100 via the communications I/F 107. The same is the case with the image processor 200.

[Other Variations]

In the above-described embodiment, a description is given of a functional configuration of the management system 1 including the image processor 200 and the management apparatus 100. However, the functional configuration of the management system 1 is not limited to this, and may be as illustrated in FIG. 17 or FIG. 18, for example.

Figure 17:
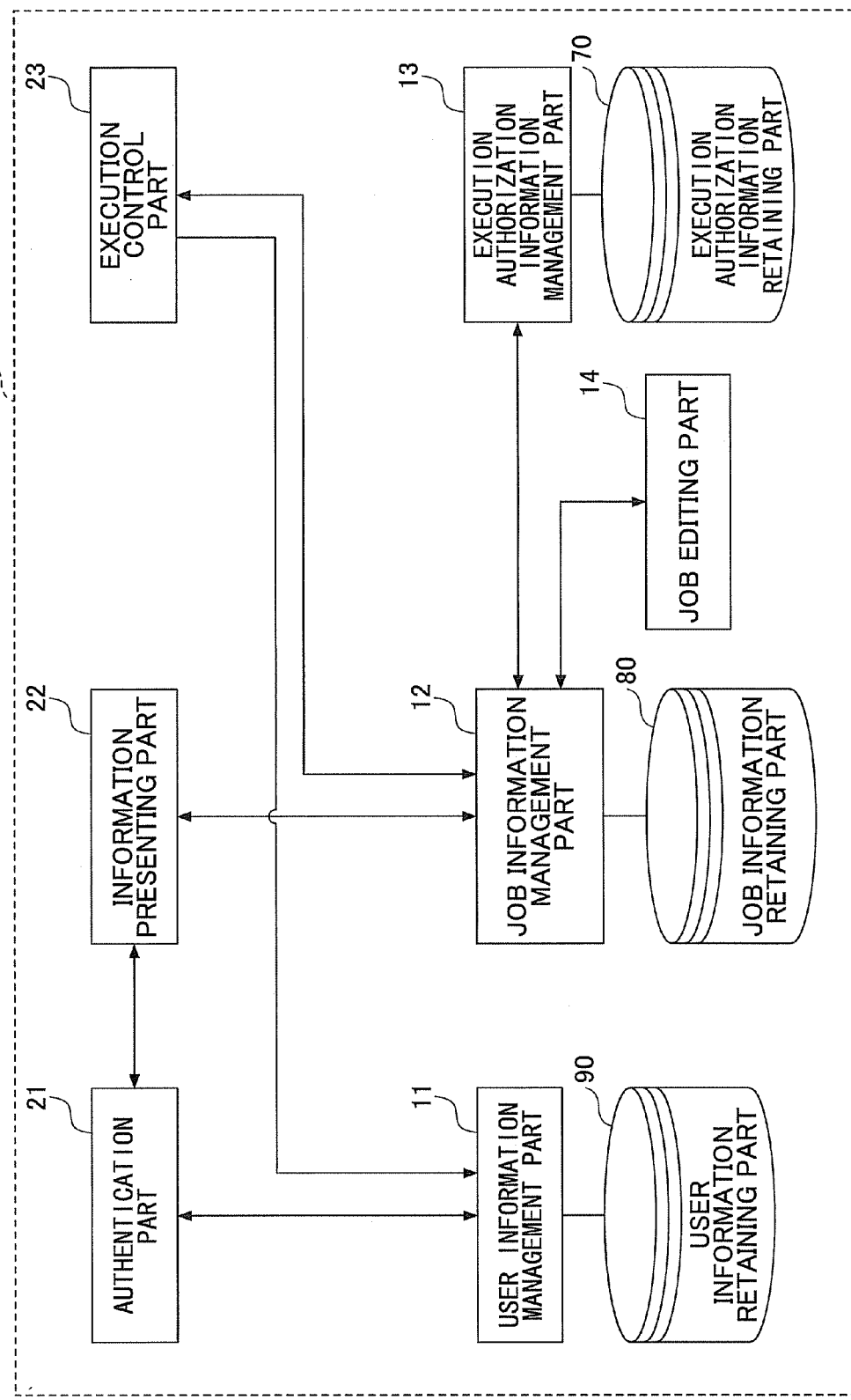
FIG. 17 is a diagram illustrating a configuration of the job execution management function according to another variation of the embodiment of the present invention.

FIG. 17 is a diagram illustrating a configuration of the job execution management function according to a variation of the embodiment. FIG. 17 illustrates a functional configuration where the image processor 200 includes all of the functional parts according to the above-described embodiment. This configuration allows the job execution management function according to the above-described embodiment to be implemented by the image processor 200 alone.

Figure 18:
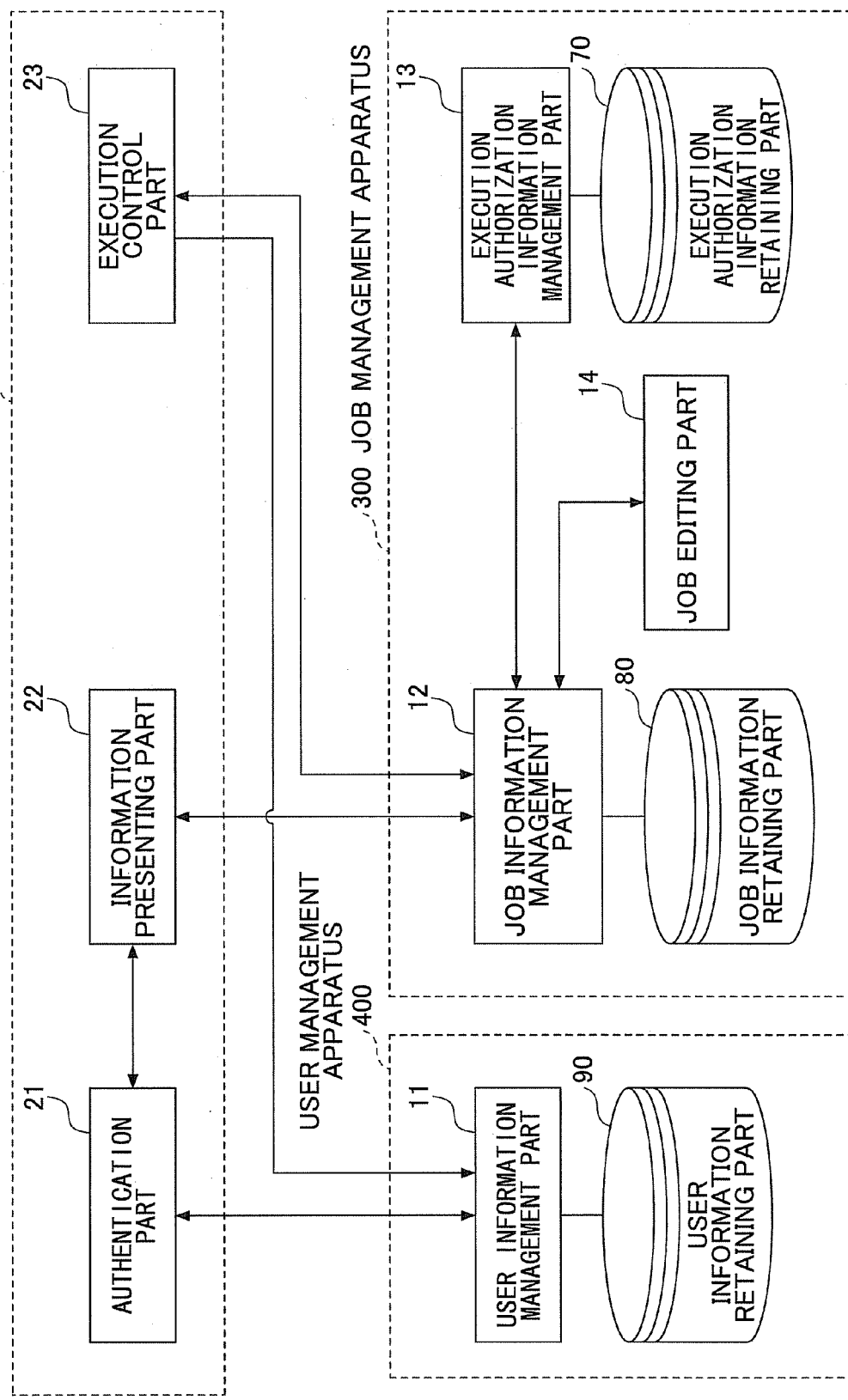
FIG. 18 is a diagram illustrating a configuration of the job execution management function according to yet another variation of the embodiment of the present invention.

FIG. 18 is a diagram illustrating a configuration of the job execution management function according to another variation of the embodiment. FIG. 18 illustrates a functional configuration of the management system 1 including a job management apparatus 300 that manages stored jobs and a user management apparatus 400 that manages users in addition to the image processor 200. In this case, the job management apparatus 300 includes the job information management part 12, the execution authorization information management part 13, and the job editing part 14, and the user management apparatus 400 includes the user information management part 11. The conjunct operation of the user information management part 11, the job information management part 12, and the execution authorization information management part 13, and the editing part 14 illustrated in the above-described embodiment is implemented by data communications between the job management apparatus 300 and the user management apparatus 400. This configuration allows the job execution management function according to the above-described embodiment to be implemented through a conjunct operation with, for example, the existing user management apparatus 400.

Further, in the above-described embodiment, the functional configuration of the management system 1 including the single management apparatus 100 and the multiple image processors 200$_1$ through 200$n$ is illustrated, while the management system 1 may include multiple management apparatuses 100$_1$ through 100$n$. In this case, the job execution management function according to the above-described embodiment may be implemented as follows.

For example, the image processor 200 may have the information presenting part 22 request each of the management apparatuses 100$_1$ through 100$n$ to obtain a job list. The image processor 200 may integrate obtained job lists JL and display the integrated job lists JL.

Further, the image processor 200 may have the information presenting part 22 obtain necessary information from each of the management apparatuses 100$_1$ through 100$n$, and generate and display the job list JL. For example, the information presenting part 22 obtains execution authorizing user identification information and usage history recording target user identification information from the execution authorization information management part 13 of each of the management apparatuses 100$_1$ through 100$n$ based on logon user identification information. The information presenting part 22 obtains the job information 80D of a logon user and an execution authorizing user from the job information management part 12 of each of the management apparatuses 100$_1$ through 100$n$ based on the logon user identification information and the execution authorizing user identification information. The information presenting part 22 generates the job list JL including the usage history recording target user identification information based on the obtained job information 80D, and displays the generated job list JL.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An output system comprising:
    a first storage that stores user information that correlates user identification information with usage restriction information with respect to each of a plurality of users, the usage restriction information being information on a restriction on usage of an output apparatus by each of the plurality of users;
    a second storage that stores output data in correlation with the user identification information of a storing user who stores the output data;
    a management apparatus including a first processor; and
    a first processor; and
    a first memory storing a first program that, when executed by the first processor, causes the management apparatus to manage the output data based on management information, the management information correlating the user identification information of the storing user with the user identification information of an execution authorized user who is authorized to output the output data of the storing user by the storing user; and
    the output apparatus including a second processor; and
    a second memory storing a second program that, when executed by the second processor, causes the output apparatus to control a logon to the output apparatus by one of the plurality of users based on a result of authentication on the user identification information of the one of the plurality of users,
    wherein
    a first list of the output data of which the storing user is the one of the plurality of users who logs on to the output apparatus is obtained,
    a second list of the output data of the storing user correlated with the execution authorized user who is the one of the plurality of users logging on to the output apparatus is obtained,
    display of the first list and the second list on a display unit is controlled,
    a request to output the output data selected from among the first list and the second list by the one of the plurality of users is received,
    outputting of the requested output data is controlled based on the usage restriction information correlated with the user identification information of the storing user,
    the outputting of the requested output data is controlled based on the usage restriction information correlated with the user identification information of the one of the plurality of users when the one of the plurality of users logs on to the output apparatus and requests to output the output data stored by the one of the plurality of users selected from among the first list, and
    the outputting of the requested output data is controlled based on the usage restriction information correlated with the user identification information of the storing user who authorizes the one of the plurality of users as the execution authorized user when the one of the plurality of users logs on to the output apparatus and requests to output the output data stored by the storing user selected from among the second list.

2. The output system as claimed in claim 1, wherein the display of the first list and the second list is controlled so that the output data of the storing user that are prevented from being output based on the usage restriction information of the storing user are disabled from being selected on the display unit.

3. The output system as claimed in claim 1, wherein the usage restriction information is information on a right of the usage of the output apparatus of each of the plurality of users.

4. The output system as claimed in claim 1, wherein the usage restriction information is information on an upper limit of the usage of the output apparatus of each of the plurality of users.

5. The output system as claimed in claim 1, wherein the management information further correlates the user identification information of the storing user and the user identification information of the execution authorized user with the user identification information of a usage history recording target user, and
    the management apparatus is further caused to update a usage history of the output apparatus of the usage history recording target user based on the management information in response to outputting of the output data of the storing user requested by the execution authorized user.

6. An output control apparatus, comprising:
    a first storage that stores user information that correlates user identification information with usage restriction information with respect to each of a plurality of users, the usage restriction information being information on a restriction on usage of an output apparatus by each of the plurality of users;
    a second storage that stores output data in correlation with the user identification information of a storing user who stores the output data;
    a processor; and
    a memory storing a program that, when executed by the processor, causes the output control apparatus to
        manage the output data based on management information, the management information correlating the user identification information of the storing user with the user identification information of an execution authorized user who is authorized to output the output data of the storing user by the storing user;
        control a logon to the output apparatus by one of the plurality of users based on a result of authentication on the user identification information of the one of the plurality of users;
        obtain a first list of the output data of which the storing user is the one of the plurality of users who logs on to the output apparatus;
        obtain a second list of the output data of the storing user correlated with the execution authorized user who is the one of the plurality of users logging on to the output apparatus;

control display of the first list and the second list on a display unit;

receive a request to output the output data selected from among the first list and the second list by the one of the plurality of users; and control outputting of the requested output data based on the usage restriction information correlated with the user identification information of the storing user;

wherein the output control apparatus is caused to control the outputting of the requested output data based on the usage restriction information correlated with the user identification information of the one of the plurality of users when the one of the plurality of users logs on to the output apparatus and requests to output the output data stored by the one of the plurality of users selected from among the first list, and the output control apparatus is caused to control the outputting of the requested output data based on the usage restriction information correlated with the user identification information of the storing user who authorizes the one of the plurality of users as the execution authorized user when the one of the plurality of users logs on to the output apparatus and requests to output the output data stored by the storing user selected from among the second list.

7. The output control apparatus as claimed in claim 6, wherein the output control apparatus is caused to control the display of the first list and the second list so that the output data of the storing user that are prevented from being output based on the usage restriction information of the storing user are disabled from being selected on the display unit.

8. The output control apparatus as claimed in claim 6, wherein the usage restriction information is information on a right of the usage of the output apparatus of each of the plurality of users.

9. The output control apparatus as claimed in claim 6, wherein the usage restriction information is information on an upper limit of the usage of the output apparatus of each of the plurality of users.

10. The output control apparatus as claimed in claim 6, wherein the management information further correlates the user identification information of the storing user and the user identification information of the execution authorized user with the user identification information of a usage history recording target user, and the output control apparatus is further caused to update a usage history of the output apparatus of the usage history recording target user based on the management information in response to outputting of the output data of the storing user requested by the execution authorized user.

11. An output control method in one or more information processing apparatuses, comprising:

storing user information that correlates user identification information with usage restriction information with respect to each of a plurality of users, the usage restriction information being information on a restriction on usage of an output apparatus by each of the plurality of users;

storing output data in correlation with the user identification information of a storing user who stores the output data;

managing the output data based on management information, the management information correlating the user identification information of the storing user with the user identification information of an execution authorized user who is authorized to output the output data of the storing user by the storing user;

controlling a logon to the output apparatus by one of the plurality of users based on a result of authentication on the user identification information of the one of the plurality of users;

obtaining a first list of the output data of which the storing user is the one of the plurality of users who logs on to the output apparatus;

obtaining a second list of the output data of the storing user correlated with the execution authorized user who is the one of the plurality of users logging on to the output apparatus;

controlling display of the first list and the second list on a display unit;

receiving a request to output the output data selected from among the first list and the second list by the one of the plurality of users; and controlling outputting of the requested output data based on the usage restriction information correlated with the user identification information of the storing user, wherein the outputting of the requested output data is controlled based on the usage restriction information correlated with the user identification information of the one of the plurality of users when the one of the plurality of users logs on to the output apparatus and requests to output the output data stored by the one of the plurality of users selected from among the first list, and the outputting of the requested output data is controlled based on the usage restriction information correlated with the user identification information of the storing user who authorizes the one of the plurality of users as the execution authorized user when the one of the plurality of users logs on to the output apparatus and requests to output the output data stored by the storing user selected from among the second list.

12. The output control method as claimed in claim 11, wherein the display of the first list and the second list is controlled so that the output data of the storing user that are prevented from being output based on the usage restriction information of the storing user are disabled from being selected on the display unit.

13. The output control method as claimed in claim 11, wherein the usage restriction information is information on a right of the usage of the output apparatus of each of the plurality of users.

14. The output control method as claimed in claim 11, wherein the usage restriction information is information on an upper limit of the usage of the output apparatus of each of the plurality of users.

15. The output control method as claimed in claim 11, wherein the management information further correlates the user identification information of the storing user and the user identification information of the execution authorized user with the user identification information of a usage history recording target user, and a usage history of the output apparatus of the usage history recording target user is updated based on the management information in response to outputting of the output data of the storing user requested by the execution authorized user.

16. The output system as claimed in claim 1, wherein control of the outputting of the requested output data determines whether to authorize execution of the outputting of the requested output data, when the one of the plurality of users logs on to the output apparatus and requests to output the output data stored by the storing user selected from among the second list.

17. The output control apparatus as claimed in claim 6, wherein control of the outputting of the requested output data determines whether to authorize execution of the outputting of the requested output data, when the one of the plurality of users logs on to the output apparatus and requests to output the output data stored by the storing user selected from among the second list.

18. The output control method as claimed in claim 11, wherein control of the outputting of the requested output data determines whether to authorize execution of the outputting of the requested output data, when the one of the plurality of users logs on to the output apparatus and requests to output the output data stored by the storing user selected from among the second list.

19. The output system as claimed in claim 1, wherein the first list and the second list are integrated and displayed as a single list.

* * * * *

UNITED STATES PATENT AND TRADEMARK OFFICE
CERTIFICATE OF CORRECTION

| | | |
|---|---|---|
| PATENT NO. | : 9,298,405 B2 | Page 1 of 1 |
| APPLICATION NO. | : 13/652662 | |
| DATED | : March 29, 2016 | |
| INVENTOR(S) | : Daisuke Kamishiro | |

It is certified that error appears in the above-identified patent and that said Letters Patent is hereby corrected as shown below:

In the claims,

At Column 23, Line 32: Please delete "a first processor; and".

Signed and Sealed this
Twenty-eighth Day of June, 2016

Michelle K. Lee
*Director of the United States Patent and Trademark Office*